(12) United States Patent
Wittenburg

(10) Patent No.: US 10,095,762 B2
(45) Date of Patent: Oct. 9, 2018

(54) DISPLAYING HIERARCHICAL MULTI-ATTRIBUTE DATA SUITABLE FOR VISUAL COMPARISON

(71) Applicant: Mitsubishi Electric Research Laboratories, Inc., Cambridge, MA (US)

(72) Inventor: Kent Wittenburg, Charlestown, MA (US)

(73) Assignee: MITSUBISHI ELECTRIC RESEARCH LABORATORIES, INC., Cambridge, MA (US)

( * ) Notice: Subject to any disclaimer, the term of this patent is extended or adjusted under 35 U.S.C. 154(b) by 392 days.

(21) Appl. No.: 15/087,148

(22) Filed: Mar. 31, 2016

(65) Prior Publication Data

US 2017/0116297 A1    Apr. 27, 2017

Related U.S. Application Data

(60) Provisional application No. 62/245,405, filed on Oct. 23, 2015.

(51) Int. Cl.
*G06F 17/30* (2006.01)
*G06F 17/22* (2006.01)
(Continued)

(52) U.S. Cl.
CPC .... *G06F 17/30572* (2013.01); *G06F 17/2241* (2013.01); *G06F 17/245* (2013.01);
(Continued)

(58) Field of Classification Search
CPC ................................................ G06F 17/30572
(Continued)

(56) References Cited

U.S. PATENT DOCUMENTS 7,827,499 B2 *    11/2010    Hao ..................... G06Q 10/10
                                                              715/713
2010/0042644 A1    2/2010    Judy et al.
(Continued)

FOREIGN PATENT DOCUMENTS

WO    2008094515 A2    8/2008

OTHER PUBLICATIONS

Wittenburg. "Setting the bar for set-valued attributes," Proceedings of the international conference on Advanced visual interfaces, AVI 10. Jan. 1, 2010. p. 253.
(Continued)

*Primary Examiner* — Chelcie Daye
(74) *Attorney, Agent, or Firm* — Gene Vinokur; James McAleenan; Hironori Tsukamoto

(57) ABSTRACT

A computer-implemented method renders hierarchical multi-attribute data in a comparative layout on a display device. The method allocates graphical areas for value partitions of the normalized hierarchy of value partitions within a graphical user interface on the display device. The allocating follows the structure and the order of the normalized hierarchy of value partitions, such that the graphical area for a parent value partition contains the graphical area for its children value partitions in a first dimension. For a proportional layout, lengths of the first dimension of the graphical areas for structurally parallel value partitions are equal, and a ratio of lengths of the first dimension of the graphical areas for comparable value partitions equals a ratio of maximal values among structurally parallel value partitions for each corresponding comparable value partition. The method renders a graphical representation of values within the graphical areas of the value partitions.

15 Claims, 22 Drawing Sheets

(51) Int. Cl.
 *G06T 1/20* (2006.01)
 *G06T 1/60* (2006.01)
 *G06F 17/24* (2006.01)

(52) U.S. Cl.
 CPC .. *G06F 17/30477* (2013.01); *G06F 17/30554* (2013.01); *G06T 1/20* (2013.01); *G06T 1/60* (2013.01)

(58) Field of Classification Search
 USPC .......................................................... 707/722
 See application file for complete search history.

(56) References Cited

U.S. PATENT DOCUMENTS

2012/0120086 A1* 5/2012 Dang ................ G06F 17/30994
 345/589
2015/0242446 A1 8/2015 Stolte et al.

OTHER PUBLICATIONS

Wittenburg et al., "Parallel bargrams for consumer-based information exploration and choice," UIST 01. Proceedings of the 14th Annual ACM symposium on user interface software and technology. Orlando, FL, Nov. 11-14, 201. Jan. 1, 2001, p. 51.

Kehrer et al. "A Model for Structure-Based Comparison of Many Categories in Small-Multiple Displays." IEEE Transactions on Visualization and Computer Graphics, vol. 19, No. 12, Dec. 2013.

Chintalapani et al. "Extending the Utility of Treemaps with Flexible Hierarchy." Proc. of Int. Conf. on Information Visualisation, London, Jul. 2004. pp. 1-10.

Vliegen et al. "Visualizing Business Data with Generalized Treemaps." IEEE Transactions on Visualization and Computer Graphics archive vol. 12 Issue 5, Sep. 2006 pp. 789-796.

\* cited by examiner

| Document No. | Country | Owner | File_Date | IPC_Class |
|---|---|---|---|---|
| JP11242100 | JP | Company_B | 1990s | G12B13 |
| JP3528583 | JP | Company_B | 1990s | G12B13 |
| US7838855 | US | Company_A | 2000s | H05H13 |
| EP0858080 | EP | Company_A | 1990s | A61N5 |
| EP1152436 | EP | Company_A | 1990s | A61N5 |
| EP1152436 | EP | Company_A | 1990s | A61N5 |
| JP10282300 | JP | Company_A | 1990s | A61N5 |
| JP10332896 | JP | Company_B | 1990s | A61N5 |
| JP11142600 | JP | Company_B | 1990s | A61N5 |
| JP2001242298 | JP | Company_B | 2000s | A61N5 |
| JP2003320039 | JP | Company_B | 2000s | A61N5 |
| JP2004121654 | JP | Company_A | 2000s | A61N5 |
| JP2004223144 | JP | Company_A | 2000s | A61N5 |
| JP2004313314 | JP | Company_A | 2000s | A61N5 |
| JP2004358237 | JP | Company_A | 2010s | A61N5 |

FIG. 4

DISPLAYING HIERARCHICAL MULTI-ATTRIBUTE DATA SUITABLE FOR VISUAL COMPARISON

RELATED APPLICATIONS

This application claims priority of provisional application 62/245,405, filed Oct. 23, 2015, and incorporated herein by reference.

FIELD OF THE INVENTION

The invention relates to digital information visualization systems and methods and more particularly to visualization of hierarchical multi-attribute data in a way suitable for visual comparison.

BACKGROUND OF THE INVENTION

Information visualization generally provides visual representations of digital data to reinforce human cognition. The data can have multiple attributes and include both numerical and non-numerical data types. The data can be displayed or visualized on a display device, such as a computer screen.

The data can be organized in different structures. For example, the data can be organized in a table structure using a model of vertical columns identifiable by name and horizontal rows, the cell being the unit where a row and column intersect. Each column in the table structure represents one data attribute. For example, a table with ten columns can represent ten attributes of data.

Also, the data can be organized in a hierarchical structure for the purposes of understanding data distributions by partitioning, where every element in the hierarchical structure, except one root element, is subordinate to a single other element. Such an element can be referred as a node, and nodes in the hierarchical structure form a parent-child relationship. The root element is usually referred as a root node. The root node does not have any parent, but has at least one child or multiple children.

One problem of the visualization of the digital data is rooted in the low-dimensionality of the display device. For example, the display device is usually two-dimensional, but the data to be visualized can have more attributes than two. This problem is even more apparent when the data are visualized to reveal comparative relationships within distributions of multiple attributes. It is easier for human eye to compare graphical objects of different positions, shapes, and/or sizes, than to compare the numbers. However, rendering graphical objects for multi-attribute data on the two-dimensional display in a manner suitable for visual comparison is challenging.

Graphical techniques for visual data comparison include bar charts, pie charts, and scatterplots, usually for one or perhaps two attributes. These graphical techniques are easy to use but offer limited information. For example, bar charts or pie charts show highly aggregated data while simultaneously omitting many other data values, such as data distribution of multiple attributes, patterns in data, correlations, or other detailed information.

The deficiency of the display device becomes even more apparent for visual comparison of hierarchical multi-attribute data. This is because the hierarchical structure provides a means of partitioning the data into meaningful units; it is desirable to preserve this hierarchical structure of the data on the display device. However, the values of the data visualized proportionally with different sizes and positions of graphical elements distort the layout of the structure making difficult the visual comparison of the hierarchical multi-attribute data.

For example, it is often required to compare values of structurally parallel data. For example, the user needs to compare the amount of different soft drinks specific people consume over a year. The data can be subdivided into different soft drinks and then in turn into measures of the amount each of a set of people consumed of those soft drinks in a year. The user would like to compare the amounts of soft drinks consumed by the same person. However, in some types of proportional visual presentations, the graphical values representing such comparable units of the data are sized with different aspect ratios and placed unpredictably on the display device. It can be difficult for the user to find and visually compare graphical objects located at semi-random positions on the display device since they are not aligned.

FIG. 1A shows a treemap visualization 110 of hierarchical multi-attribute data. Treemaps display hierarchical data as a set of nested rectangles, bringing out the overall proportional information within the hierarchical data structure. Each branch of the tree is given a rectangle, which is tiled with smaller rectangles representing sub-branches. The treemaps by construction make efficient use of space and illuminate proportional distributions of the data at high as well as low levels of the hierarchical structure. However, comparable values, including particularly leaf nodes, have rectangles that are placed in nonaligned positions, making them difficult to visually compare. For example, the rectangle 120 represents data comparable to rectangle 130. In this example, the area of rectangles 120 and 130 represent amounts of different soft drinks consumed by the same person. The hierarchy divides soft drinks by amount consumed per person, but, as can be seen from this example, the standard treemap visualization makes visual comparison of structurally comparable data difficult to find and compare.

FIG. 1B shows a generalized treemap framework that makes structurally comparable elements visually comparable by means of a matrix layout. The effect of a matrix layout is to make the graphical elements of parallel structures the same size and shape with the use of empty space. For example, in FIG. 1B, the values associated with Bridget 191 and Marty 192 are easy to compare. However, because intermediate parallel nodes are all of the same size, the visualization loses its power to present an easily understood comparative overview of the data at intermediate and higher levels of the hierarchy. For example, in FIG. 1B, an overall comparison of the number of cases of Family Law 160, Corporate Law 170, and Real Estate 180 is difficult to comprehend. To the extent the comparison can be comprehended, the individual cases at lower levels of the tree such as 191 and 192 have to be visually summed within each higher level structure and then mentally compared without the benefit of direct visual graphics.

Accordingly, there is a need in the art of digital data visualization to provide a system and a method for displaying hierarchical multi-attribute data for visual comparison of structurally parallel data.

SUMMARY OF THE INVENTION

Multi-attribute data can be organized into partitions and sub-partitions of the data values as determined by a hierarchy of attributes, also known as a tree of attributes. Each child in the hierarchical structure determines a next subpartitioning of the data of its parent's partitions. Thus a single path in the attribute hierarchy tree is represented by multiple value partitions of the data, one for each of the partitions of its parent. The value partitions that share a common path in the attribute hierarchy tree are in general comparable. For example, users want to compare apples to apples or an attribute within a set of apples such as color or size to a comparable attribute, namely, color or size.

Some embodiments of the invention are based on the recognition that it is desirable to utilize the hierarchical structure of the data when rendering graphical representations of the value partitions on the display device, because the hierarchical structure provides guidance to meaningful visual comparisons about data in the hierarchy. However, the complexity of the hierarchical structure can obfuscate visual review of the comparable elements. Thus, some embodiments render the values of comparable elements in the hierarchical structure on the display device in a manner that increases the ability for users to find and compare those elements.

To that end, some embodiments are based on a realization that visual comparison is facilitated if the comparable graphical areas can be visually aligned, e.g., in the horizontal and/or vertical dimension. Accordingly, some embodiments of the invention allocate on the display device a set of graphical areas for the value partitions in the multi-attribute hierarchy such that the comparable graphical areas are aligned.

A realization underlying one aspect of some embodiments is that visual alignment for the purpose of comparing proportional data entails finding a normalized partitioning and a common ordering. To that end, some embodiments normalize the partitioning across all comparable elements. Normalized partitioning has the same number of partitions in the same order.

For example, some embodiments normalize and order a hierarchy of value partitions of the data corresponding to the hierarchy of attributes of the data. The embodiments allocate graphical areas within a graphical user interface on the display device for value partitions of the normalized hierarchy following the structure and the order of that normalized hierarchy of value partitions. In such a manner, the hierarchical nature of the data is represented on the display device. In addition, some embodiments allocate the graphical areas such that the graphical area for a parent value partition contains the graphical area for its children value partitions in some dimensions, e.g., a horizontal and/or vertical dimension. Because of the structure the normalized and ordered hierarchy, the graphical areas for comparable elements of the hierarchy of value partitions can be aligned, e.g., in the horizontal and/or the vertical dimension.

Some embodiments of the invention are based on a realization that there are different types of comparable elements of a hierarchy. One type includes different elements of the same branch of the tree of the hierarchy, such as sibling elements. Another type includes the same elements of different branches of the hierarchy. The first type of elements is referred herein as comparable elements or comparable value partitions in terms of the hierarchy of value partitions. The comparable value partitions have the same attribute path and different value paths with different values of the last element of the value paths. Another type of elements is referred herein as structurally parallel elements or structurally parallel value partitions. The structurally parallel value partitions have the same attribute path and different value paths with the same value of the last element of the value paths. The value path is the path through the hierarchy formed by the values of the attributes.

Some embodiments of the invention are based on recognition that comparative layout should allow a concurrent visual comparison for both types of comparable elements, i.e., the comparable value partitions and the structurally parallel value partitions. Such a comparative layout can merge the visualization of different types of data, which reduces the need for repeated visualization and saves the computational and memory resources of the digital data visualization system.

However, the comparable value partitions and the structurally parallel value partitions have different location arrangement on the layout preserving the hierarchical structure of the data. Specifically, the comparable value partitions, e.g., the siblings, are typically located adjacent to each other. Conversely, the structurally parallel value partitions are typically separated by other elements of the hierarchy. To that end, it is easier to visually locate the comparable value partitions than the structurally parallel value partitions.

To address this problem, some embodiments determine the dimensions of the graphical areas allocated for the comparable value partitions differently from determining the dimensions of graphical areas allocated for the structurally parallel value partitions. For example, some embodiments allocate the same length along at least one dimension of the graphical areas for the structurally parallel value partitions, e.g., allocate the same width for the graphical areas, but scale proportionally the width of the graphical areas for the comparable value partitions. In such a manner, the closeness of location allows for visual comparison of the comparable value partitions, and the same length of the graphical areas allocated for the structurally parallel value partitions can be visually contrasted with different length of other value partitions, which allows users to visually locate the structurally parallel value partitions.

For example, one embodiment allocates the graphical areas for at least some graphical areas representing the value partitions in a proportional layout, such that lengths of a first dimension of the graphical areas for structurally parallel value partitions are equal and a ratio of lengths of the first dimension of the graphical areas for the comparable value partitions equals a ratio of maximal values among structurally parallel value partitions for each corresponding comparable value partition. Examples of the first dimension include a horizontal dimension, such that the length of the first dimension is a width of the graphical area, and a vertical dimension, such that the length of the first dimension is a height of the graphical area.

Because the structurally parallel value partitions have equal lengths, some embodiments provide a graphical representation of a value of a value partition within the graphical area of the value partition. For example, some embodiments of the invention are based on realization that a relative value of a value partition can be represented using a positive measure and a negative measure. The positive measure represents an extent, i.e., how big is the value in comparison with a test value. For example, the value of the value partition can be 20% of the test value. In contrast, the negative measure represents a lack of extent, i.e., how small is the value in comparison with the test value. For example, the value of value partition can be 80% less than the test value. Notably, the sum of the positive and negative measures is 100% of the test value. To that end, in one embodiment, the graphical representation of the value of the value partition divides the graphical area of the value partition into two visually distinguishable spaces, wherein a ratio of areas of the two visually distinguishable spaces equals a ratio of the value of the value partition with the maximal value among the structurally parallel value partitions of the value partition.

Additionally or alternatively, e.g., for non-proportional layouts, some embodiments of the invention are based on the realization that common x- and y-scales are useful in order to embed graphical comparison information within higher level structures that may themselves be proportional. To that end, one embodiment regularizes the x- and y-dimension scales of the graphical representations for the values of the structurally parallel value partitions. For example, the graphical representations for the non-proportional layout can include one or combination of a histogram, a scatter plot, and a connected line graph utilizing common y-scale representing the value of the value partition.

One embodiment is based on another realization that children of normalized and proportionally rendered elements of the hierarchy may not be normalized and proportionally rendered themselves without losing a uniform density property of visual comparison. The uniform density property holds that the ratio between values and the dimensions of the graphical areas representing the values needs to remain constant throughout the hierarchy. If this property holds, the elements are comparable throughout the hierarchy through their relative sizes of the graphical areas. However, if elements representing empty value partitions are added through the normalization process, the relative graphical area available for children of such partitions is affected, and the uniform density property can be violated. A strategy to avoid this problem is to use non-proportional representations for children of normalized proportionally rendered elements in the hierarchy.

For example, in one embodiment, the children value partitions are rendered in the non-proportional layout if the parent value partition is rendered in the proportional layout. For example, the graphical representations for the children value partitions can include histograms conveying comparative value information through heights, wherein a ratio of a height of the histogram for a value of a child value partition with a maximal height of the histogram bounded by the graphical area equals a ratio of the value of the child value partition with the maximal value among the structurally parallel value partitions of the child value partition.

Accordingly, one embodiment of the invention discloses a computer-implemented method for rendering hierarchical multi-attribute data in a comparative layout on a display device. The method includes determining a hierarchy of attributes of the data specifying parent-child relationships of the attributes, wherein each attribute has a set of values; partitioning iteratively the data according to the hierarchy of attributes to produce a hierarchy of value partitions, wherein the iterative partitioning includes partitioning values of the data according to values of a parent attribute to produce a set of value partitions and further partitioning values of each value partition according to values of children attributes of the parent attribute until the data for all attributes in the hierarchy of attributes are partitioned; normalizing the hierarchy of value partitions by adding an empty value partition for each value of the attribute missing from the hierarchy of value partitions and ordering the value partitions; allocating graphical areas for value partitions of the normalized hierarchy of value partitions within a graphical user interface on the display device, wherein the allocating follows the structure and the order of the normalized hierarchy of value partitions, such that the graphical area for a parent value partition contains the graphical area for its children value partitions in a first dimension, wherein, for at least some graphical areas representing the value partitions in a proportional layout, lengths of the first dimension of the graphical areas for structurally parallel value partitions are equal, and wherein a ratio of lengths of the first dimension of the graphical areas for comparable value partitions equals a ratio of maximal values among structurally parallel value partitions for each corresponding comparable value partition, wherein the comparable value partitions have the same attribute path and different value paths with different values of the last element of the value paths, and wherein the structurally parallel value partitions have the same attribute path and different value paths with the same value of the last element of the value paths; and rendering a graphical representation of a value of a value partition within the graphical area of the value partition, wherein steps of the method are performed by a processor operatively connected to the display device.

Another embodiment discloses a system for rendering hierarchical multi-attribute data in a comparative layout, including a display device; a memory to store the data, wherein values of the data are organized in a table structure having a plurality of columns corresponding to the dimensions of the data and a plurality of rows corresponding to records of the data, wherein each value of the data is identified by an intersection of a column and a row; and a processor operatively connected to the display device and to the memory. The processor determines a hierarchy of attributes of the data specifying parent-child relationships of the attributes, wherein each attribute has a set of values; partitions iteratively the data according to the hierarchy of attributes to produce a hierarchy of value partitions, wherein the iterative partitioning includes partitioning values of the data according to values of a parent attribute to produce a set of value partitions and further partitioning values of each value partition according to values of child attributes of the parent attribute until the data for all attributes in the hierarchy of attributes are partitioned; normalizes the hierarchy of value partitions by adding an empty value partition for each value of the attribute missing from the hierarchy of value partitions and ordering the value partitions in the normalized hierarchy of value partitions; allocates graphical areas within a graphical user interface on the display device for value partitions of the normalized hierarchy of value partitions, the allocating following the structure and the order of the normalized hierarchy of value partitions, such that the graphical area for a parent value partition contains the graphical area for its children value partitions in a first dimension, wherein, for at least some graphical areas representing the value partitions in a proportional layout, lengths of the first dimension of the graphical areas for structurally parallel value partitions are equal, and wherein a ratio of lengths of the first dimension of the graphical areas for comparable value partitions equals a ratio of maximal values among structurally parallel value partitions for each corresponding comparable value partition, wherein the comparable value partitions have the same attribute path and different value paths with different values of the last element of the value paths, and wherein the structurally parallel value partitions have the same attribute path and different value paths with the same value of the last element of the value paths; and renders a graphical representation of a value of a value partition within the graphical area of the value partition.

Yet another embodiment discloses a non-transitory computer-readable medium with instructions stored thereon, that when executed by a processor, perform steps including determining a hierarchy of attributes of hierarchical multi-attribute data specifying parent-child relationships of the attributes, wherein each attribute has a set of values; partitioning iteratively the data according to the hierarchy of attributes to produce a hierarchy of value partitions, wherein the iterative partitioning includes partitioning values of the data according to values of a parent attribute to produce a set of value partitions and further partitioning values of each value partition according to values of child attributes of the parent attribute until the data for all attributes in the hierarchy of attributes are partitioned; normalizing the hierarchy of value partitions by adding an empty value partition for each value of the attribute missing from the hierarchy of value partitions and ordering the value partitions; allocating graphical areas within a graphical user interface on a display device for value partitions of the normalized hierarchy of value partitions, the allocating following the structure and the order of the normalized hierarchy of value partitions, such that the graphical area for a parent value partition contains the graphical area for its children value partitions in a first dimension, wherein, for at least some graphical areas representing the value partitions in a proportional layout, lengths of the first dimension of the graphical areas for structurally parallel value partitions are equal, and wherein a ratio of lengths of the first dimension of the graphical areas for comparable value partitions equals a ratio of maximal values among structurally parallel value partitions for each corresponding comparable value partition, wherein the comparable value partitions have the same attribute path and different value paths with different values of the last element of the value paths, and wherein the structurally parallel value partitions have the same attribute path and different value paths with the same value of the last element of the value paths; and rendering a graphical representation of a value of a value partition within the graphical area of the value partition.

BRIEF DESCRIPTION OF THE DRAWINGS

FIG. 4 is an example of the data illustrating some embodiments of the invention;

DETAILED DESCRIPTION OF THE PREFERRED EMBODIMENT

Figure 1A:
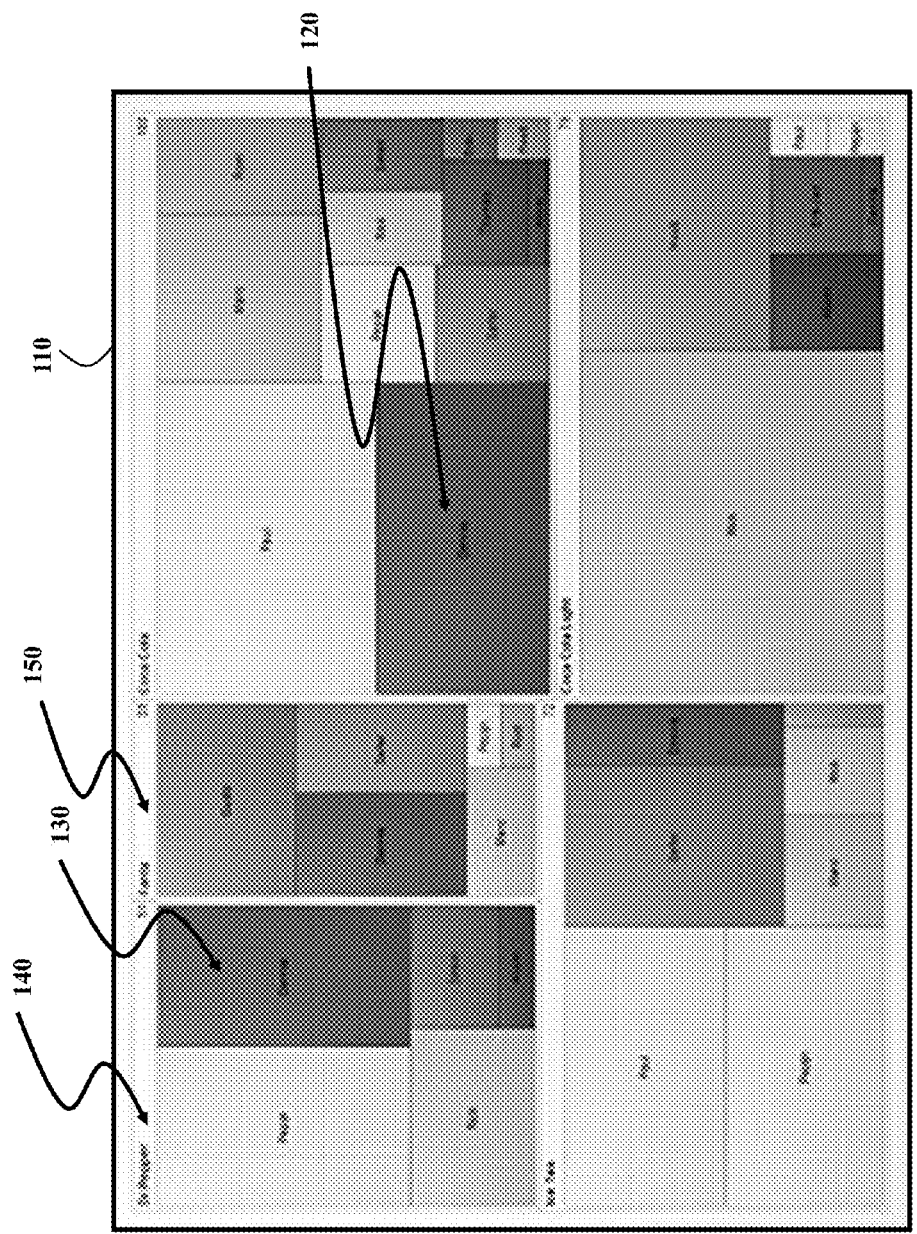
FIG. 1A is a schematic of a conventional treemap visualization of hierarchical multi-attribute data.
Figure 1B:
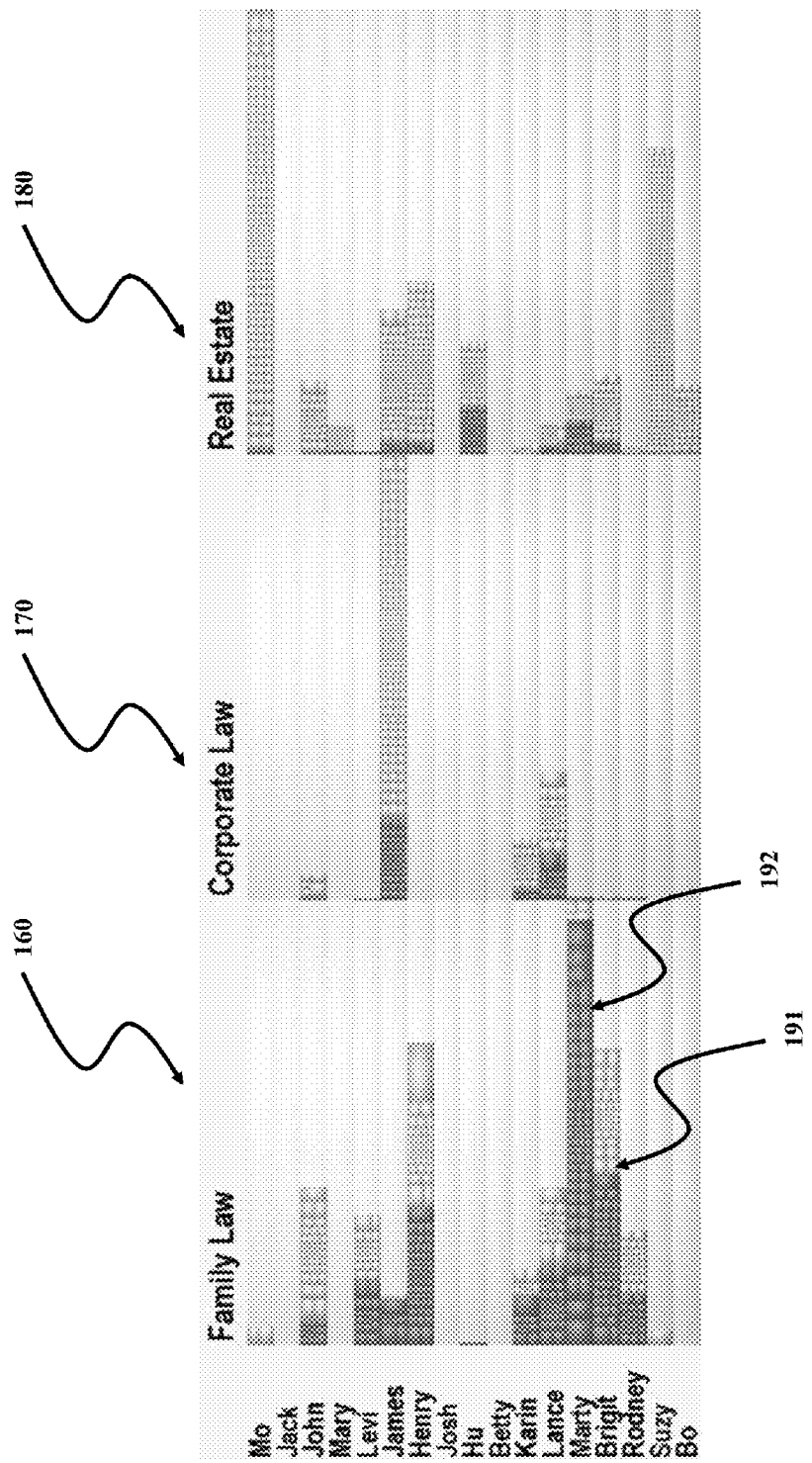
FIG. 1B is a conventional generalized treemap framework using a matrix layout.
Figure 2:
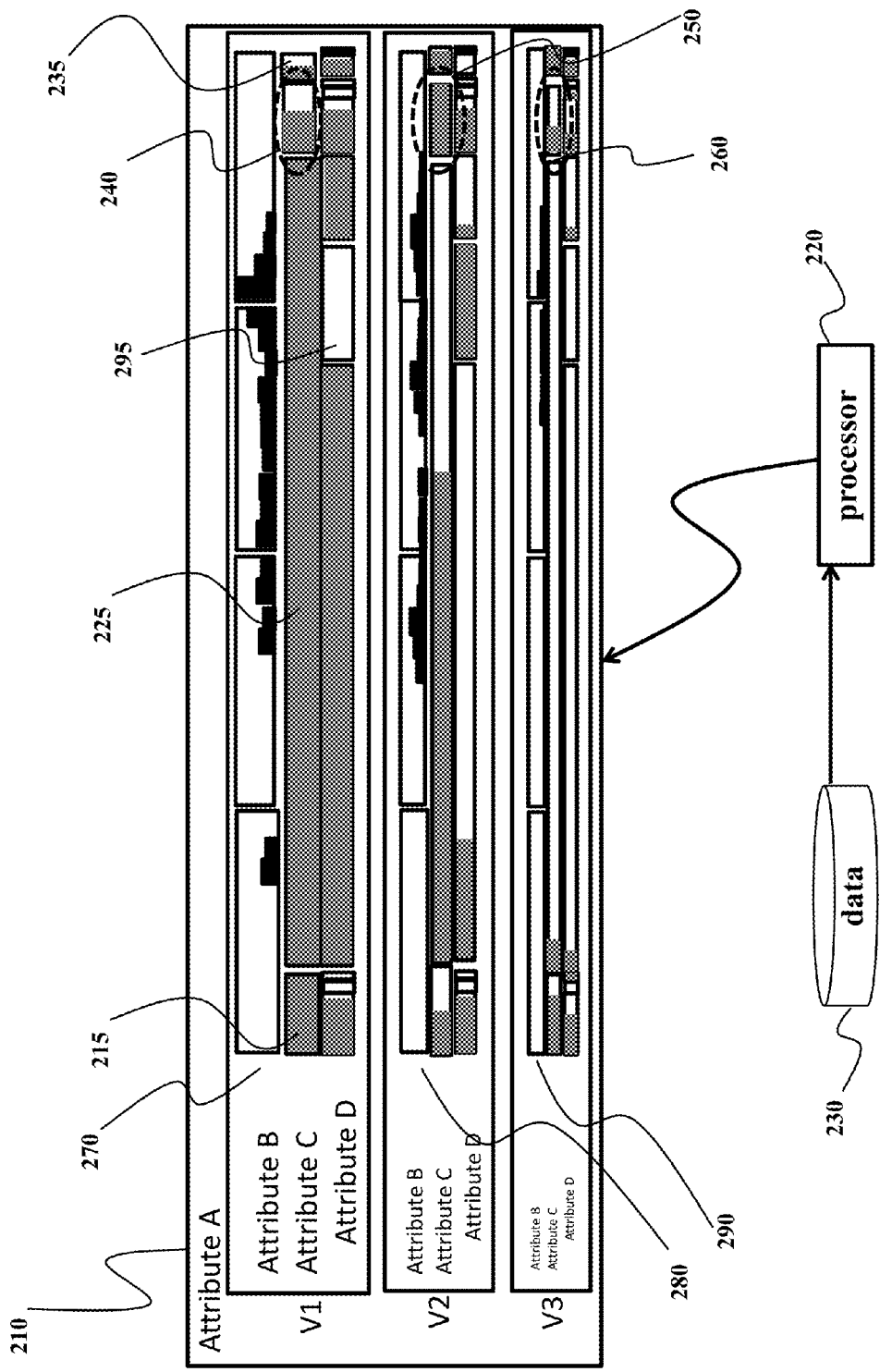
FIG. 2 is a schematic of a comparative visualization of hierarchical multi-attribute data on a display device according to some embodiments of the invention.

FIG. 2 shows an illustration of a comparative visualization of hierarchical multi-attribute data on a display device according to principles employed by some embodiments of the invention. The data can be visualized on the display device 210 using a processor 220 operatively connected to both a memory 230 storing the data and to the display device 210. For example, values of the data stored in the memory can be organized in a table structure having a plurality of columns corresponding to the dimensions of the data and a plurality of rows corresponding to records of the data. Each value of the data is identified by an intersection of a column and a row. The processor, the memory and the display device can be connected using wires or can be connected wirelessly, e.g., through an intranet and the Internet.

Some embodiments of the invention are based on the recognition that it is desirable to utilize the hierarchical structure of the data when placing graphical representations on the display device, because the hierarchical structure provides guidance to meaningful visual comparisons about data in the hierarchy. The values of comparable elements in the hierarchical structure are rendered on the display in a manner such that users can visually locate the comparable elements. To that end, some embodiments are based on a realization that visual comparison is possible if the graphical areas for representations of structurally comparable values are visually aligned even when the areas are not immediately adjacent.

Some embodiments of the invention are based on a realization that there are different types of comparable elements of a hierarchy. One type includes different elements of the same branch of the tree of the hierarchy, such as sibling elements. Another type includes the same elements of different branches of the hierarchy. The first type of elements is referred herein as comparable elements or comparable value partitions in terms of the hierarchy of value partitions. The comparable value partitions have the same attribute path and different value paths with different values of the last element of the value paths. Another type of elements is referred herein as structurally parallel elements or structurally parallel value partitions. The structurally parallel value partitions have the same attribute path and different value paths with the same value of the last element of the value paths.

Some embodiments of the invention are based on recognition that comparative layout should allow a concurrent visual comparison for both types of comparable elements, i.e., the comparable value partitions and the structurally parallel value partitions. Such a comparative layout can merge the visualization of different types of data, which reduces the need for repeated visualization and saves the computational and memory resources of the information visualization system.

However, the comparable value partitions and the structurally parallel value partitions have different location arrangement on the layout preserving the hierarchical structure of the data. Specifically, the comparable value partitions, e.g., the siblings, are typically located adjacent to each other. Conversely, the structurally parallel value partitions are typically separated by other elements of the tree. To that end, it is easier to visually locate the comparable value partitions than the structurally parallel value partitions.

For example, the graphical areas 240, 250, and 260 represent structurally parallel value partitions. These graphical areas are aligned vertically and are of the same width. Renderings within these areas indicate the proportion of a partition's value of the maximal value found across all comparable structures.

The graphical areas 215, 225, 240, and 235 represent comparable value partitions and aligned horizontally. Their values can be compared proportionally by the relative width of adjacent areas. Within the graphical areas, the proportion for each value partition may be seen as a fill within the graphical area as in 240.

The graphical depiction for the value distributions of the comparable structures in the path "/Attribute A/*/Attribute B/*" are seen in rows 270, 280, and 290. Their value distributions are easily comparable in the horizontal dimension as a histogram. Their non-local, but still parallel and comparable, value distributions are visually comparable via vertical alignment of elements in 270, 280, and 290 since they share common x-scales. The y-scales are rendered proportionally since these attributes are children of the values of a proportionally rendered parent, namely "Attribute A".

Similarly, any other structurally comparable values in the information hierarchy are aligned vertically or horizontally, and visual comparison is enabled. Distributions of the measures of the data partitions are conveyed by proportional size in either the horizontal or vertical dimension or else via a common scale as in a histogram. Overall proportional distribution at the high levels of the structure is easily discernable, and thus the visualization conveys an overview of the data. For example, it is easy to see that the V1 partition of Attribute A has the highest measures in the data overall compared to V2 and V3, but there are still some comparative gaps in V1's internal data measures, as conveyed, for example, by the empty space 295.

Figure 3:
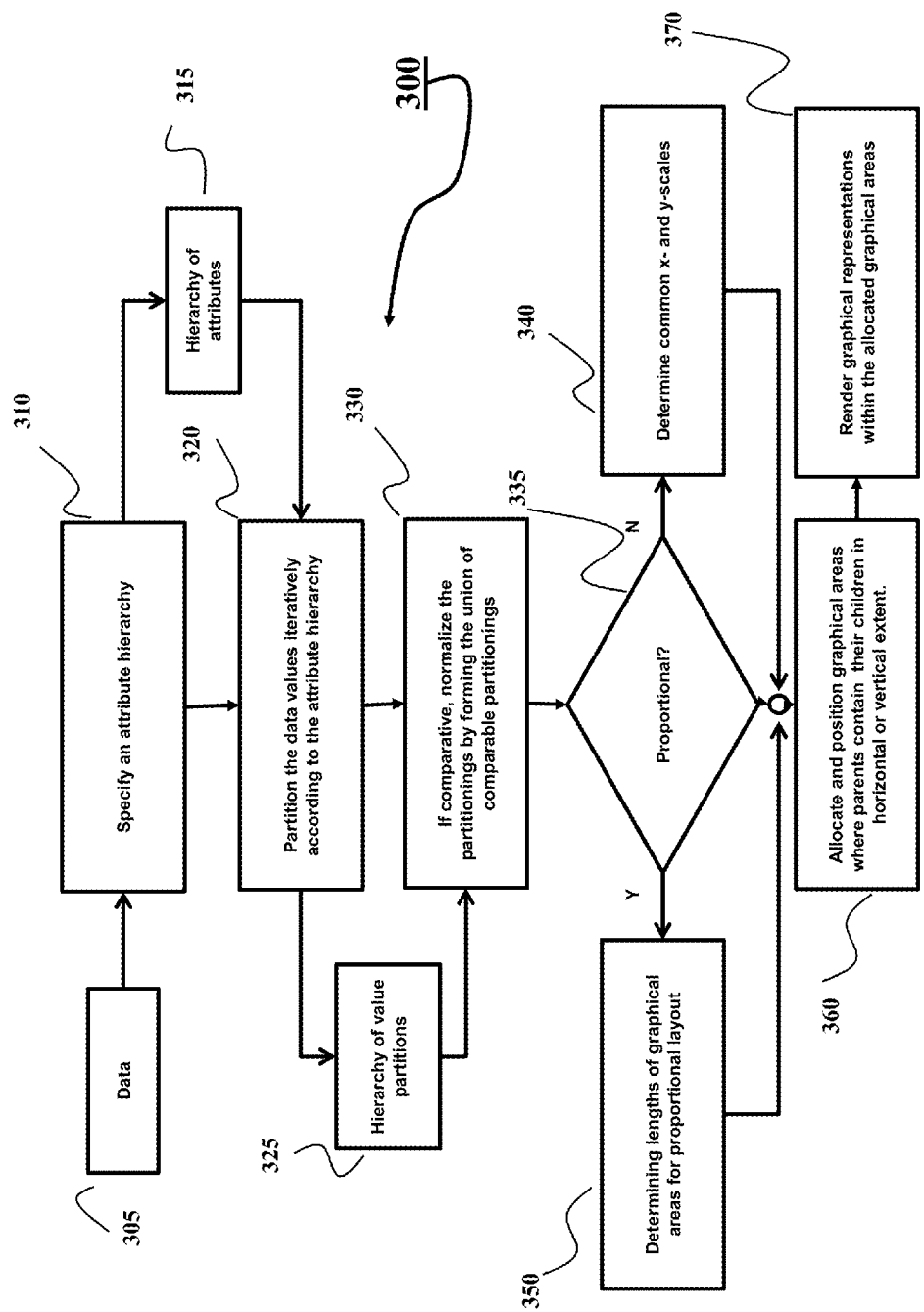
FIG. 3 is a block diagram of a method for rendering hierarchical multi-attribute data in a comparative layout on a display device according to some embodiments of the invention.

FIG. 3 shows a block diagram of a method 300 for rendering hierarchical multi-attribute data in a comparative layout on a display device. The steps of the method are performed by a processor operatively connected to the display device, e.g., the processor 220.

The method determines 310 a hierarchy of attributes 315 of the data 305 specifying parent-child relationships of the attributes. For example, the hierarchy of attributes can be determined using a model of the data that organizes values of the data in a table structure having a plurality of columns corresponding to the attributes of the data and a plurality of rows corresponding to records of the data, in which each value of the data is identified by an intersection of a column and a row.

Each attribute has a set of values, i.e., one or multiple values. The values of the attribute can be determining using a binning process. Statistical data binning is a way to group a number of more or less continuous values into a smaller number of "bins". For example, if the data is about a group of people, the binning may arrange people by their ages into a smaller number of age intervals. For example, if the data include values for patent applications filed in different countries, the binning can organize the data by owners and/or countries of filing. Binning can also be used in multivariate statistics, binning in several dimensions at once.

The data values are then partitioned 320 iteratively according to the attribute hierarchy, producing a hierarchy of value partitions 325. The iterative partitioning includes partitioning values of the data according to values of a parent attribute to produce a set of value partitions and further partitioning values of each value partition according to values of child attributes of the parent attribute until the data for all attributes in the hierarchy of attributes are partitioned.

The hierarchy of value partitions is then normalized 330 by adding an empty value partition for each value of the attribute missing from the hierarchy of value partitions and ordering the value partitions after the empty value partitions are added. To that end, all corresponding branches of such a normalized hierarchy of value partitions have the same number of value partitions in the same order.

Various embodiments allocate 360 graphical areas within a graphical user interface on the display device for value partitions of the normalized hierarchy of value partitions, the allocating following the structure and the order of the normalized hierarchy of value partitions, such that the graphical area for a parent value partition contains the graphical area for its children value partitions in a first dimension. Because of the structure of the normalized and ordered hierarchy, the graphical areas for comparable elements of the hierarchy of value partitions are aligned, e.g., in the horizontal and/or the vertical dimension.

Some embodiments of the invention render the graphical areas for value partitions using a proportional layout. According to the proportional layout the dimensions of the graphical areas are determined 350 such that lengths of the first dimension of the graphical areas for structurally parallel value partitions are equal, and a ratio of lengths of the first dimension of the graphical areas for comparable value partitions equals a ratio of maximal values among structurally parallel value partitions for each corresponding comparable value partition.

One embodiment also renders the graphical areas for value partitions using a non-proportional layout. To that end, the embodiment tests 335 the type of the layout for a particular set of value partitions. If the parallel data partitions are to be rendered non-proportionally, the embodiment determines 340 a common x- and y-scales that encompass all values in the value partitions.

The method renders 370 a graphical representation of a value of a value partition within the graphical area of the value partition. For example, for the proportional layout, as for the graphical areas 240 and 260, the graphical representation of the value of the value partition can be determined to divide the graphical area of the value partition into two visually distinguishable spaces. In some embodiments, a ratio of areas of the two visually distinguishable spaces equals a ratio of the value of the value partition with the maximal value among the structurally parallel value partitions of the value partition. For example, for the non-proportional layout, as for the graphical areas in the row 270, the graphical representation can include one or combination of a histogram, a scatter plot, and a connected line graph utilizing common y-scale representing the value of the value partition.

FIG. 4 shows an example of the data 305 to illustrate some embodiments of the invention. In this example, the data relate to the patent domain organized in a data table 400 having a plurality of columns, such as Country 430 and Owner 440, and a plurality of rows such as rows 410 and 420. Each row includes a record for a patent asset. This example uses the count of patent assets (rows) as a measure function. Other measure functions are possible. Also, in this example, the binning groups the temporal data values in column 450 in decades, but other examples can bin the data at a different level of granularity. File_Dates are days of filing a patent application.

Figure 5:
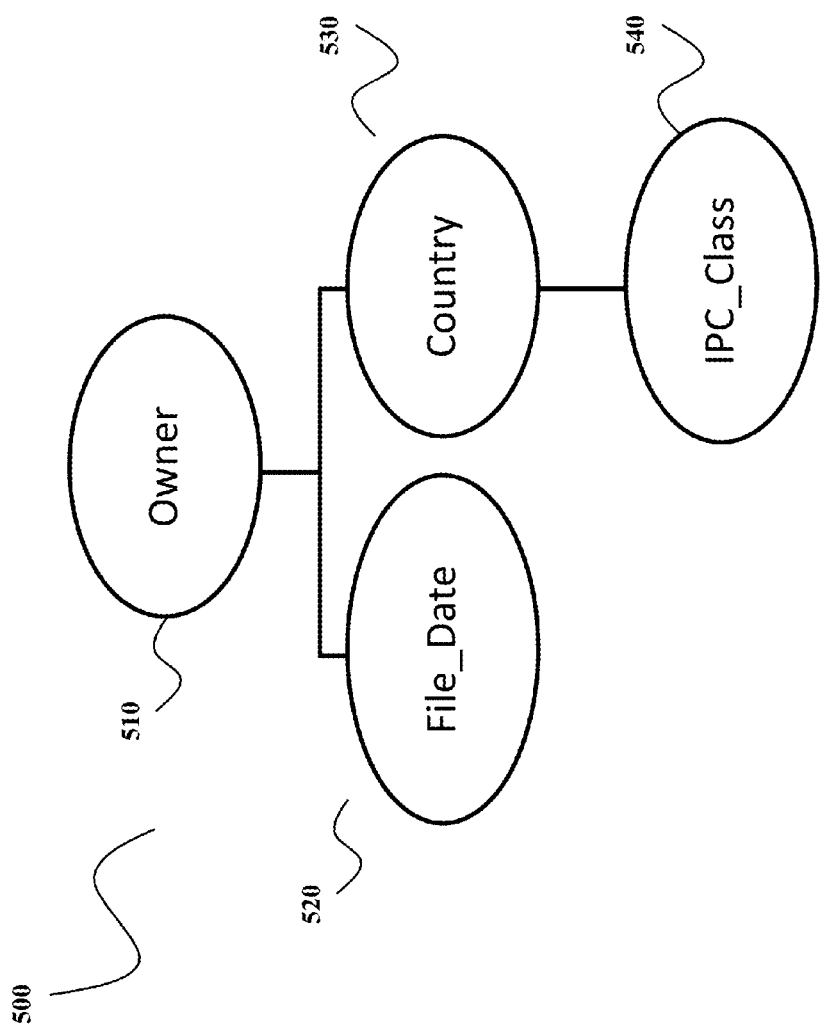
FIG. 5 is an example of the hierarchy of attributes specified for the data of FIG. 4 according to some embodiments of the invention.

FIG. 5 shows an example 500 of the hierarchy of attributes 315 specified for the data table 400. This example includes a root node 510 as the owner attribute. The root node has two children, i.e., the attributes File_Date 520 and Country 530. The node 530 has one child 540 specifying the IPC_Class for each country for the each owner.

The method 300 partitions 320 the data values iteratively according to the hierarchy of attributes 315 to form a hierarchy of value partitions 325. The iterative partitioning includes partitioning values for each parent attribute into a set of partitions, and further partitioning values of each partition for each child attribute until values for all attributes are partitioned.

Figure 6:
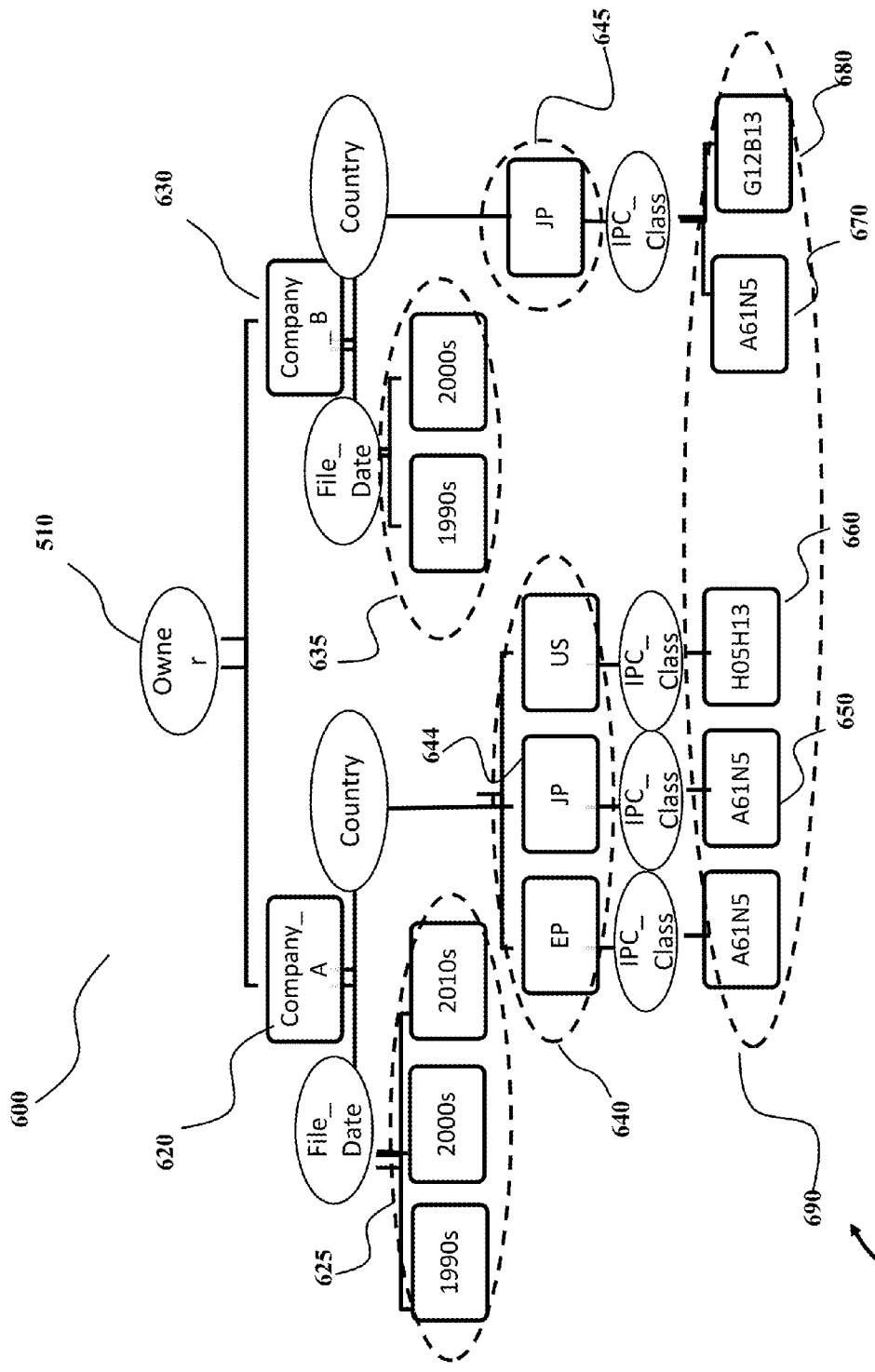
FIG. 6 is an example of the hierarchy of value partitions determined according to some embodiments of the invention.

FIG. 6 shows an example 600 of the hierarchy of value partitions 325 determined for the table 400 according to the exemplar hierarchy of the attributes 500. For illustrative purposes only, the example 600 includes elements having an oval shape to represent the attributes and elements having a rectangular shape with rounded corners to represent value partitions determined for the values of the attributes.

Starting from the root node of the attribute hierarchy 510, which in this case is Owner, the unique values or bins of those values in the column Owner in table 400 are enumerated. Those values, i.e., the values of the attribute Owner, are Company_A and Company_B, and these become the children 620 and 630 of the Owner node 610. For each of those value partitions, the rows in table 400 with those values for Owner are examined for the columns File_Date and Country, which are at the next level of the hierarchy of attribute. The unique values of those attributes form the subsequent partitioning of the data. For example, elements 640 are value partitions for values of the attribute Country. In this example, the attribute Country has three values EP, JP and US. The value partitions for the values of the attribute Country are numbers of patent filings for EP, JP or US.

This process iterates until all values in the table 400 are placed in the value partition tree 600. In this example, the attributes are primarily categorical, alternative embodiments use other methods available for partitioning values in the columns of numerical and temporal attributes that involve active binning. As a result of the iterative process of value partitioning, the hierarchy of attributes 315 is reflected in the partitions of the values of the table cells in 400.

The hierarchy of the attributes 500 and the hierarchy of value partitions 600 determine comparable value partitions. Levels of the value partition tree alternate between attribute nodes and value partition nodes. However, the comparable value partitions have the same attribute path. For example, the value partitions in 640 have a common attribute path "/Owner/Country/". One can reasonably compare such data. Similarly, the value partitions in each of the subtrees shown in 690 all share a common attribute path, "/Owner/Country/IPC Class/". On the other hand, the value nodes at the attribute paths "/Owner/File Date/" 625 and "/Owner/Country/" 640 are not comparable since they have different attribute paths.

The comparable value partitions have the same attribute path and different value paths with different values of the last element of the value paths. For example, for the path "/Owner/Company_A/Country/EP/IPC_Class/A61N5", its attribute path is "/Owner/*/Country/*/IPC_Class/". Its value path is "/Company_A/EP/A61N5".

For example, the value paths for the value partitions 640 are "/Owner/Company_A/Country/EP," "/Owner/Company_A/Country/JP," and "/Owner/Company_A/Country/US." As can be seen, those value paths have different values of the last element of the value paths.

The hierarchy of the attributes 500 and the hierarchy of value partitions 600 also determine structurally parallel value partitions. The structurally parallel value partitions have the same attribute path and different value paths with the same value of the last element of the value paths. For example, the value partition 644 and the value partition 645 are structurally parallel partitions. They have the same attribute path, i.e., "/Owner/*/Country/*/," different value path "/Owner/Company_A/Country/JP" and "/Owner/Company_B/Country/JP," but the same value of the last element of the value paths, i.e., "JP."

The hierarchy of value partitions 600 is not normalized, i.e., parallel partitions can have a different number of and/or different values for their node partitions. In 600, the value partitions for Company_A/Country/ 640 and the value partitions for Company B/Country/ 645 are different. In this case, the partitioning for the Company A's Countries 640 includes three values: EP, JP, and US. In contrast, the partitioning for the Company B's Countries 645 includes only one value: JP, i.e., the value partition for the values of the attributes EP and US are missing. If such a non-normalized tree is utilized for determining a display on the display device for the purpose of visually comparing values, the comparable value partitions can be misaligned or entirely absent from the display.

Accordingly, the method 300 normalizes 330 the hierarchy of value partitions 325 by adding an empty value partition for each value of the attribute missing from the hierarchy of value partitions and ordering the value partitions.

Figure 7:
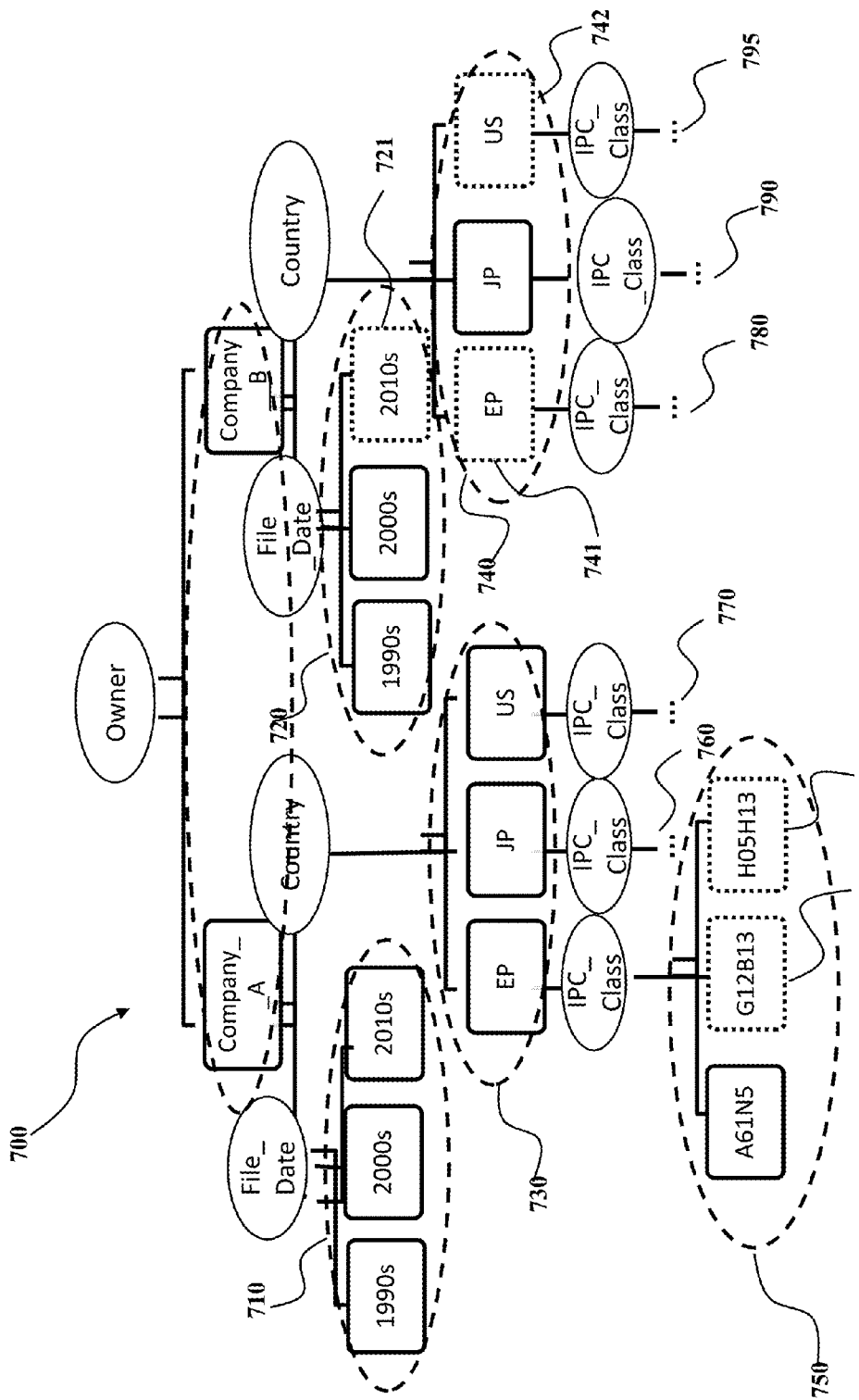
FIG. 7 is an example of the normalization of the hierarchy of value partitions of FIG. 6 according some embodiments of the invention.

FIG. 7 shows an example 700 of the normalization of the hierarchy of value partitions according some embodiments of the invention. For example, a union of parallel partitions for /Owner/*/File_Date/ in 625 and 635 includes partitions for the three decades as shown in 710 and 720. The missing value 721 for decade 2010 is added to the partitioning at the path /Owner/Company_B/File Date/. Similarly, the values 741 EP and 742 US are added to the partitioning at /Owner/Company_B/Country/ 740 in order to make a common set of values in parallel partitions 730 and 740. For all value partitions sharing the attribute path /Owner/*/Country/*/IPC_Class/, the value partitions shown in 750 are repeated (though not shown for lack of space) in 760, 770, 780, 790, and 795. In the case of the partitioning 750, the partitions 751 and 752 are added. Accordingly, all parallel nodes in the structure 700 are transformed to have a common partitioning that may include empty, e.g., null, values.

Figure 8:
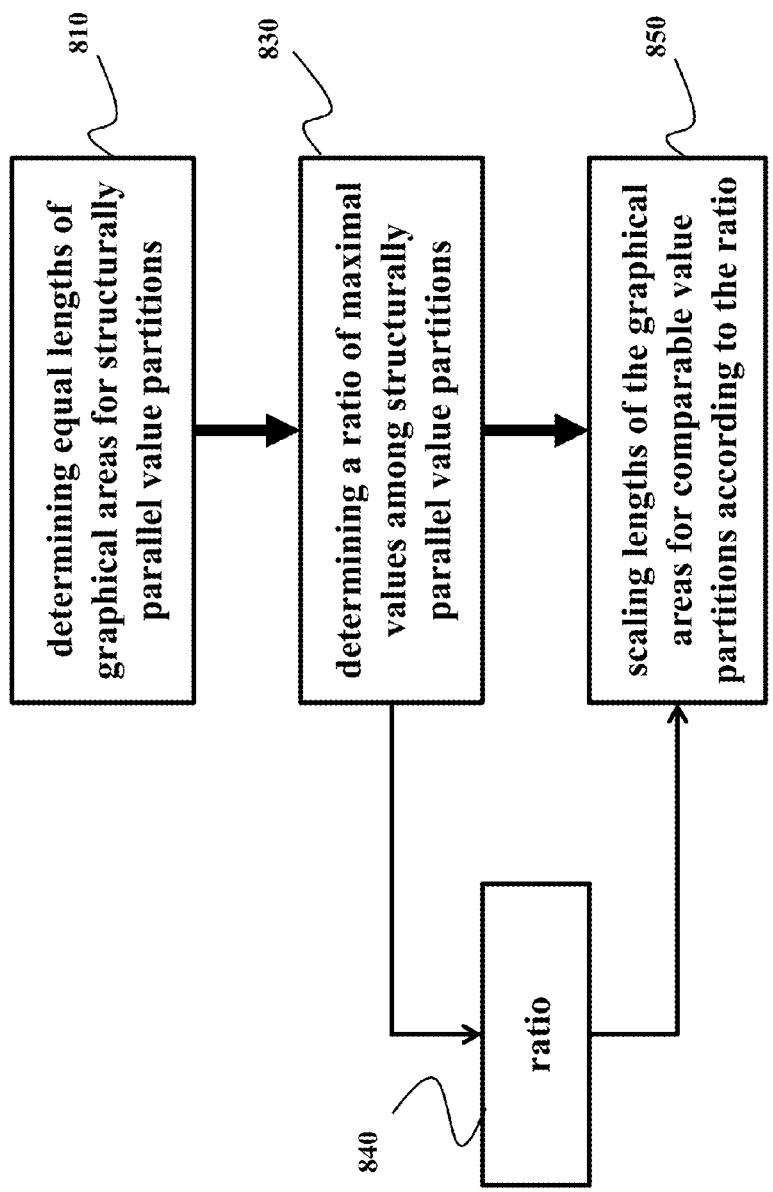
FIG. 8 is a block diagram of a method for determining length of the comparable and structurally parallel value partitions according to one embodiment of the invention.

FIG. 8 shows a block diagram of a method for determining length of the comparable and structurally parallel value partitions according to one embodiment of the invention. The lengths are determined along one or multiple dimensions of the graphical areas. For example, the method determines 810 equal lengths of the first dimension of the graphical areas for structurally parallel value partitions. If the first dimension is horizontal dimension, the length of the first dimension is the width of the graphical area. For example, the equal width of the graphical areas for the structurally parallel value partitions is determined based on the resolution of the display device and a number of value partitions in the hierarchy.

For the comparable value partitions, the method determines 830 a ratio 840 of maximal values among structurally parallel value partitions for each corresponding comparable value partition and scales 850 the lengths of the first dimension of the graphical areas for comparable value partitions according to the ratio. If the first dimension is horizontal dimension, the widths of the graphical area of comparable value partitions are scaled according to the ratio 840.

Figure 9A:
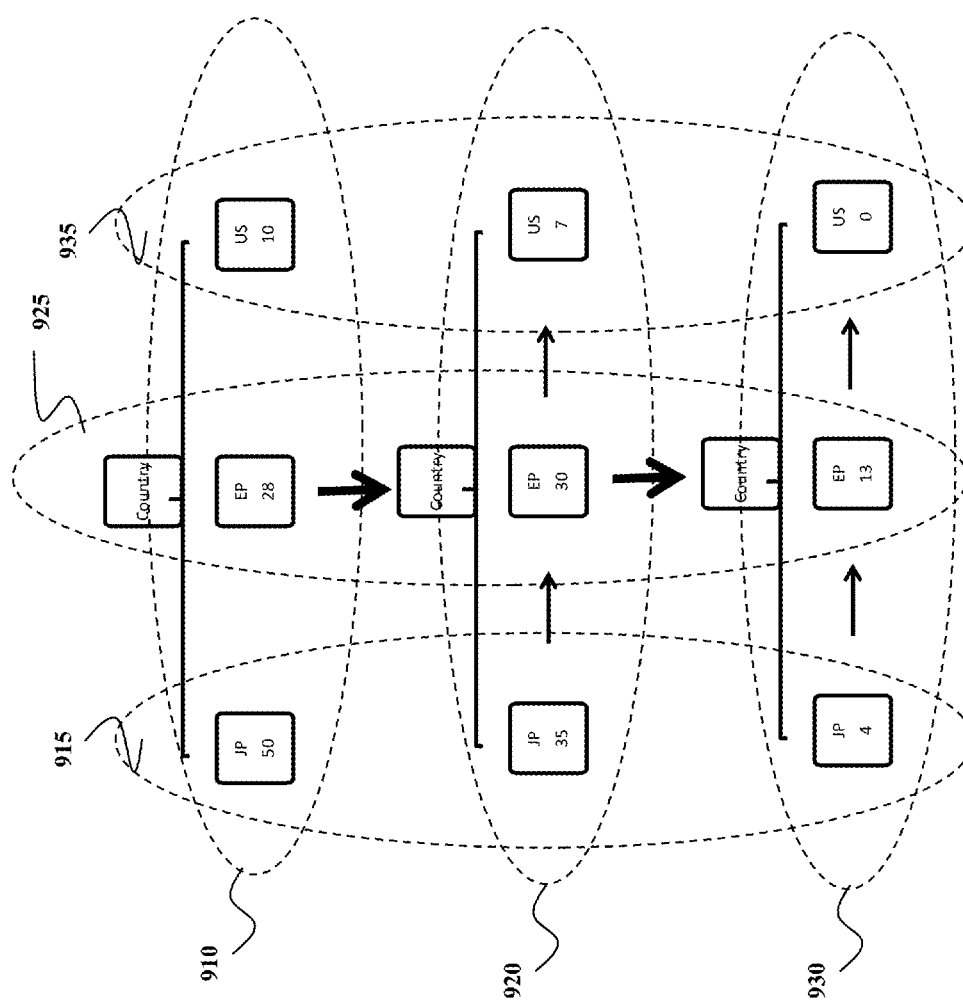
FIG. 9A is a schematic of selecting the maximal values among structurally parallel value partitions for each corresponding comparable value partitions according to some embodiments of the invention.

FIG. 9A shows a schematic of selecting the maximal values among structurally parallel value partitions for each corresponding comparable value partitions according to some embodiments of the invention. For example, the comparable value partitions are filings 910, 920, and 930 by countries JP, EP, and US. For example, the filings 910 are done by a Company_A, the filings 920 are done by a Company_B, and the filings 930 are done by a Company_C. In this example, the structurally parallel value partitions are partitions 915 for country JP, partitions 925 for country EP, and partitions 935 for country US.

Figure 9B:
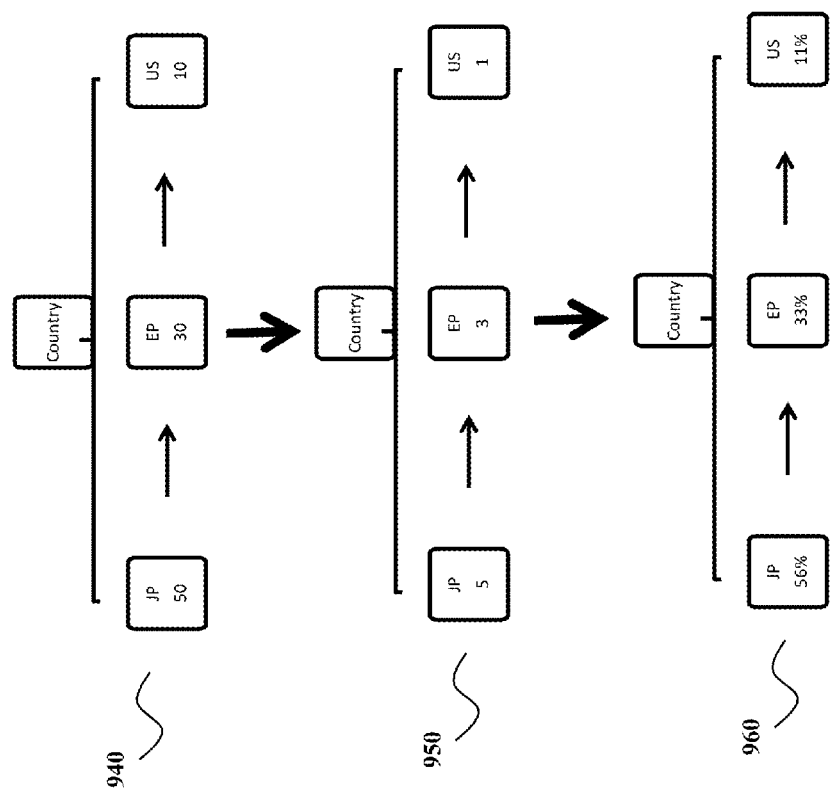
FIG. 9B is an example of maximal values among structurally parallel value partitions.

FIG. 9B shows an example of maximal values 940 among structurally parallel value partitions. In this example, the maximal value among value partitions for JP is 50, the maximal value among value partitions for EP is 30, and the maximal value among value partitions for US is 10. Accordingly, for this example, the ratio 840 is 50/30/10 940, or 5/3/1 950, or 56%/33%/11% 960. The length, e.g., widths, of the graphical areas for comparable value partitions for JP, EP, and US is scaled accordingly.

Figure 10:
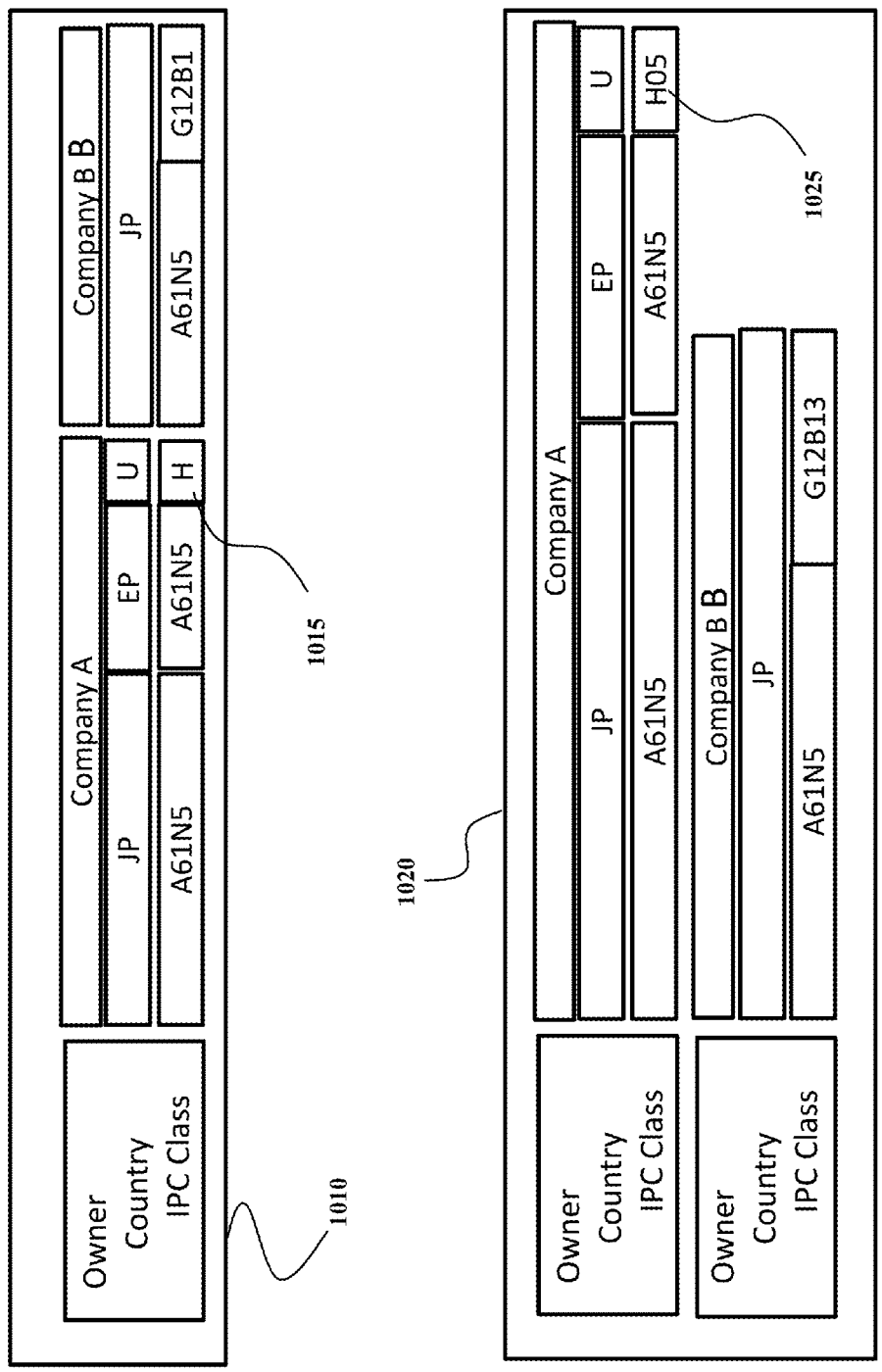
FIG. 10 is an example of a proportional but non-comparative rendering having a problem addressed by some embodiments.

FIG. 10 shows an example of a proportional but non-comparative rendering having a problem addressed by some embodiments. The top treemap 1010 shows a horizontally-oriented proportional layout. The bottom embedded barchart 1020 shows a vertical stacking of the partitions at the top level to produce an embedded barchart, in which the lengths of the bars reflect proportional values. In both cases it can be relatively difficult to understand structurally comparable information of embedded values. For example, how does a user can compare the measure of Company A's IPC_Class H(05H13)1015 or 1025 for U(S) holdings with holdings of Company B? The user would have to visually search through the rendering to discover that Company B has no US holdings, and therefore of course no IPC_Class H(05H13) holdings. Some embodiments of the invention address this issue by aligning the graphical areas that reflect such value comparisons.

Figure 11:
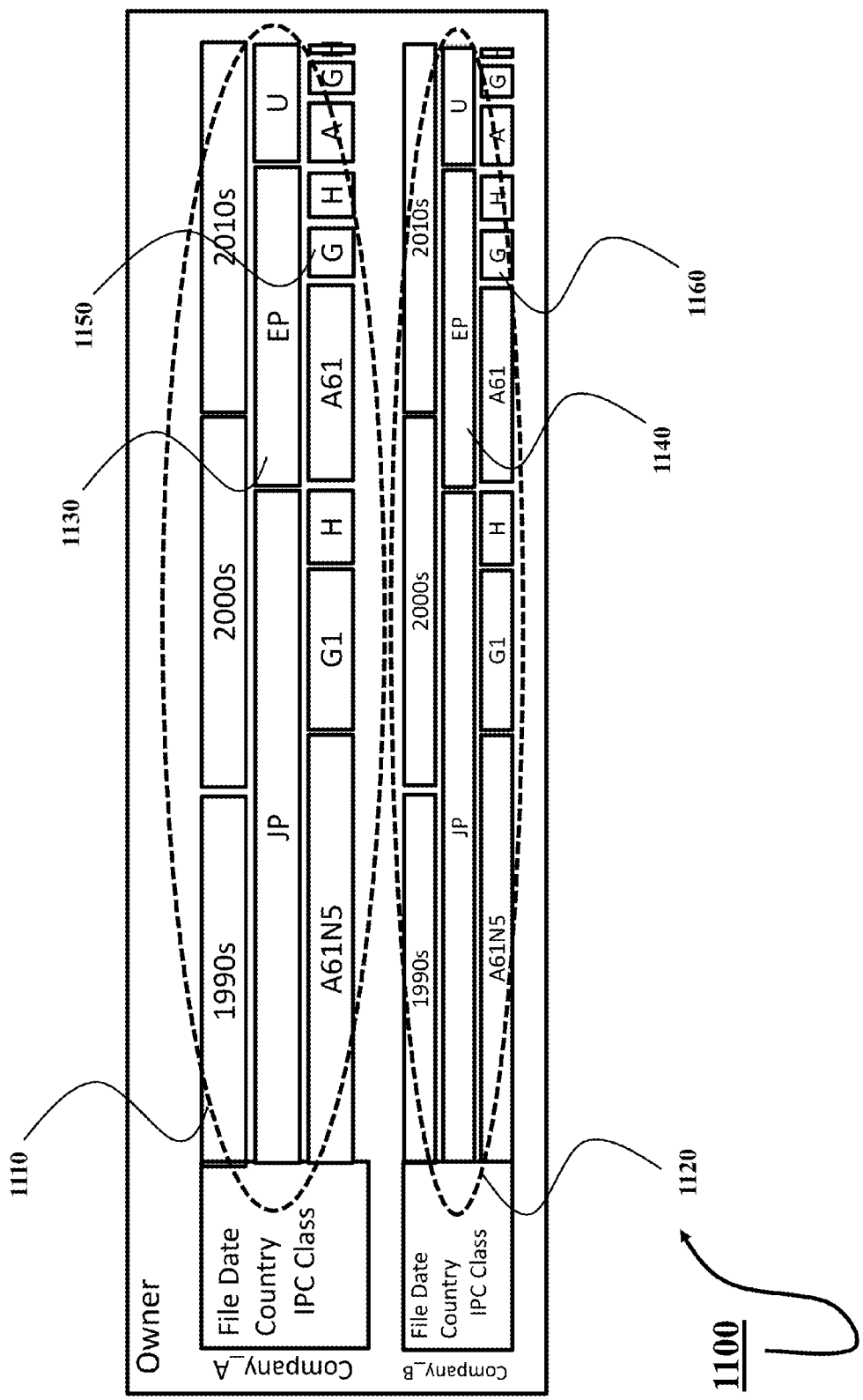
FIG. 11 is an example of allocating the graphical areas according to some embodiments of the invention.

FIG. 11 shows an example 1100 of allocating 360 the graphical areas according to some embodiments where parents contain their children in the horizontal or vertical extent. The layout 1100 is related to 1020 in that the value partitions of the top level Owner 510 are stacked vertically. However, because the layout reflects the normalization of the value partitions 700 rather than the non-normalized partitions 600, the horizontal rows are "stretched" to fill in 100% of the horizontal space. Also, the vertical space is used proportionally. The first value partitions of Owner 510 are partitions with values Company A and Company B, shown as graphical areas 1110 and 1120, respectively. Those value partitions 1110 and 1120 are positioned adjacently in the vertical dimension and sized proportionally in the vertical dimension. All remaining children partitions are placed within the vertical extent of their parents. One advantage of using the vertical orientation at the root level and horizontal orientation at subsequent levels is that all parallel value partitions other than the top-level are vertically aligned. For example, the graphical area for /Owner/Company A/Country/EP 1130 is vertically aligned with parallel partition /Owner/Company B/Country/EP 1140. At the next level of the hierarchy, /Owner/Company A/Country/EP/G(12B13) 1150 is also vertically aligned with parallel partition/Owner/Company B/Country/EP/G(12B13) 1160. Such vertical alignments make it possible to find comparative structures relatively easily, even within proportionally divided attributes.

Also, in the example 1100, the lengths of the graphical areas of the value partitions along a second dimension orthogonal to the first dimension is a function of a value of a value partition determined for a first value on a corresponding value path. In this example, the first dimension is horizontal to represent the widths of the graphical areas, and the second dimension is vertical to represent the height of the graphical areas. The height of the graphical areas for the parent value partition 1120 is less than the height of the graphical areas for the parent partition 1110.

Figure 12:
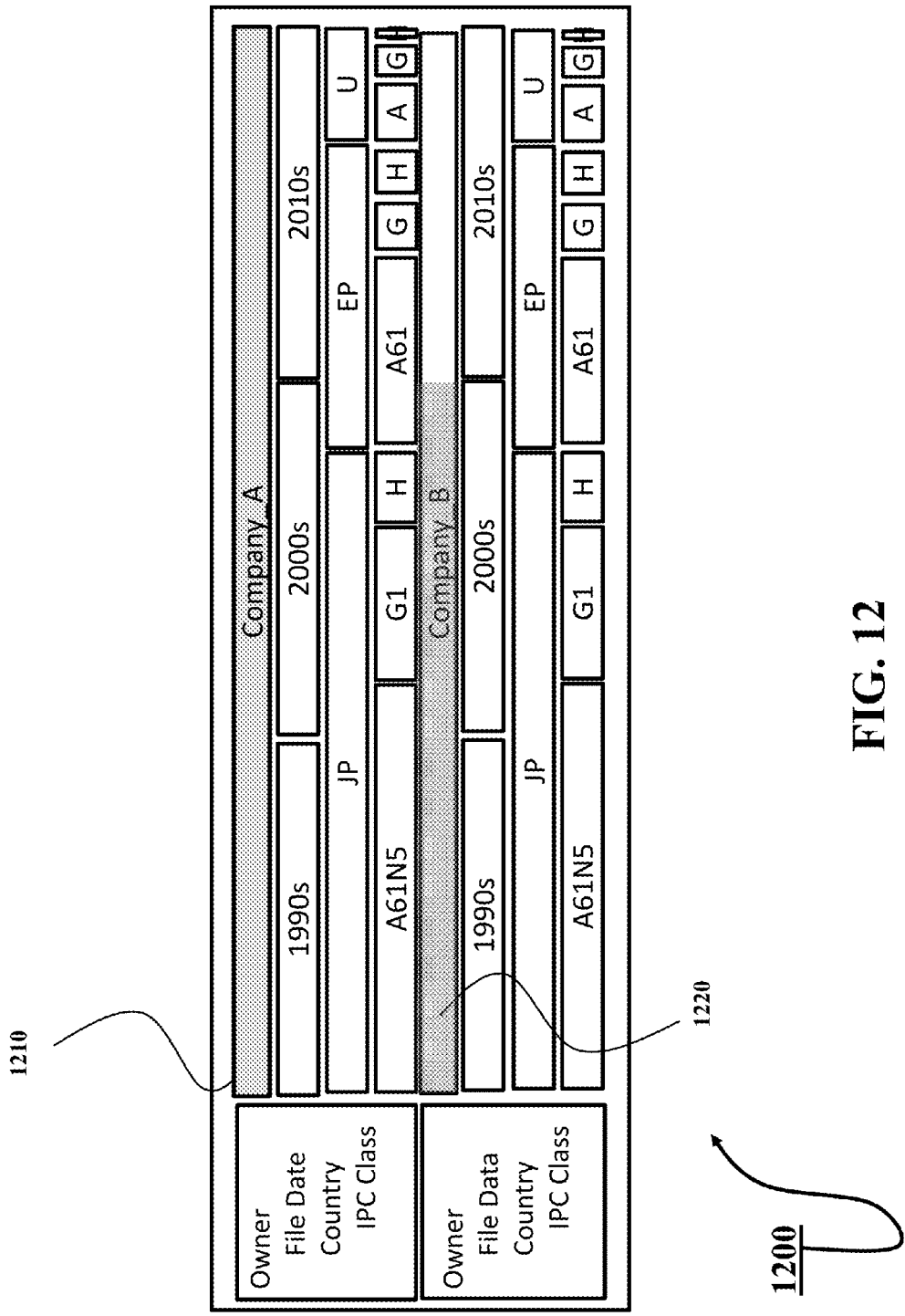
FIG. 12 is an example of 360 the graphical areas according to another embodiment of the invention.

FIG. 12 shows another example 1200 of allocating 360 the graphical areas according to some embodiments where parents contain their children in the horizontal or vertical extent. Instead of using variable relative height to reveal proportional distributions at the first level, as in the example 1100, the example 1200 uses a vertical arrangement with equal row height and makes use of a bar in the horizontal dimension to show proportional information within the top level partitioning. The proportional value of Owner has been given its own row. The distributions of value /Owner/Company_A compared to /Owner/Company_B are made clear through the use of the variable length bars in 1210 and 1220. This embodiment has the advantage that text remains readable and of equal size throughout the vertically oriented attributes. However, this embodiment requires more vertical space overall than the space-filling variable height method exemplified in FIG. 11. The layout is no longer space-filling in the usual sense; rather, the layout height is extended to accommodate as much as necessary the equal-height rows. Other embodiments can place, for example, the bars indicating relative information of the measures of the top level partitioning elsewhere in the graphical representation.

Figure 13:
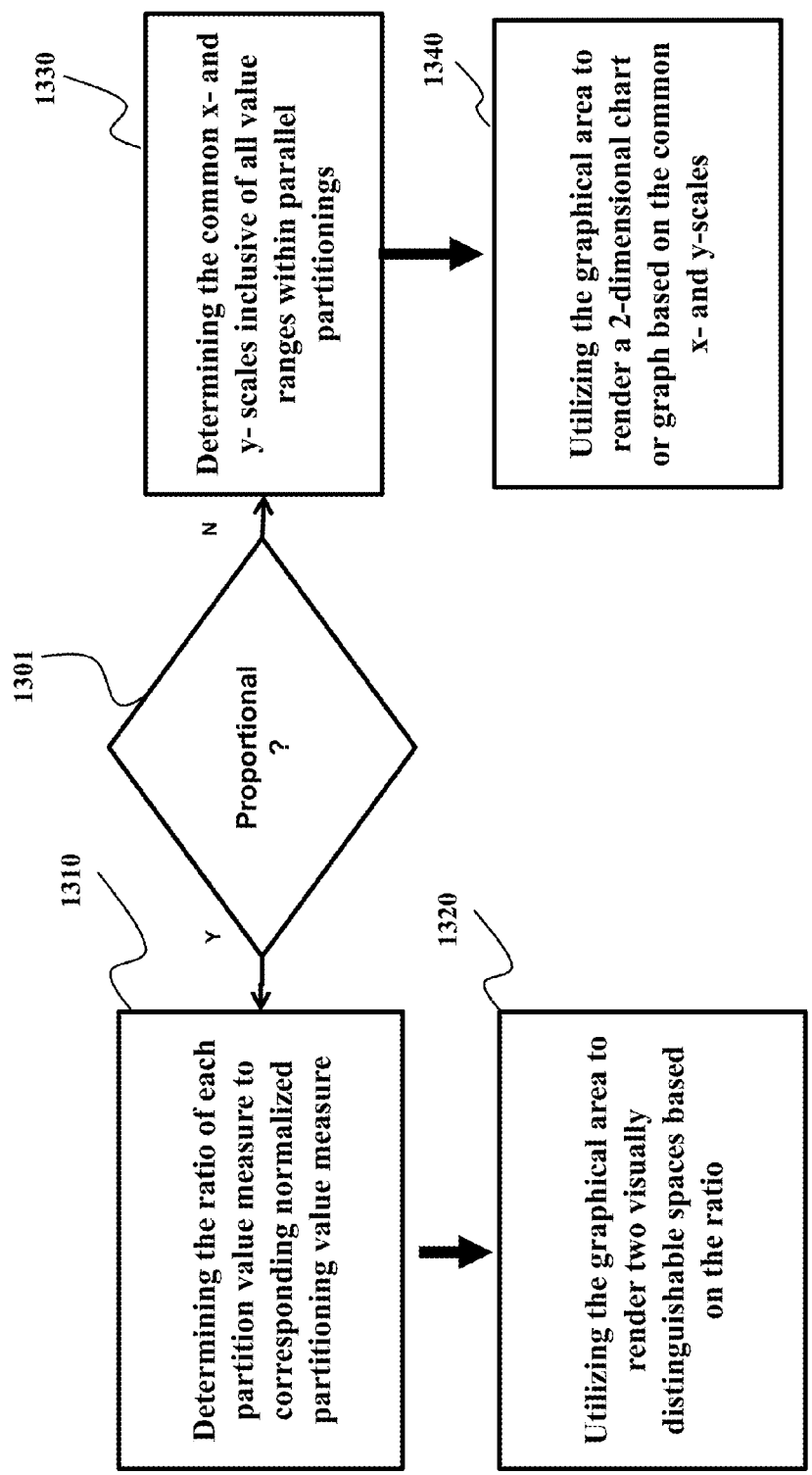
FIG. 13 is a block diagram of a method for rendering graphical representations of values of the data according to some embodiments of the invention.

FIG. 13 shows a block diagram of a method for rendering a graphical representation of a value of a value partition within the graphical area of the value partition according to some embodiments of the invention. The method can render 1301 the graphical representation for proportional layouts, using steps 1310 and 1320, and for non-proportional layouts, using steps 1330 and 1340.

For proportional layouts, some embodiments of the invention are based on realization that a relative value of a data element can be represented using a positive measure and a negative measure. The positive measure represents an extent, i.e., how big, of a value of the data element in comparison with a test value. For example, the value of the data element can be 20% of the test value. In contrast, the negative measure represents a lack of extent, i.e., how small the value of data element in comparison with the test value. For example, the value of the data element can be 80% less than the test value. Notably, the sum of the positive and negative measures is 100% of the test value. For non-proportional layouts, some embodiments of the invention are based on the realization that common x- and y-scales are useful in order to embed graphical comparison information within higher level structures that may themselves be proportional.

Figure 14:
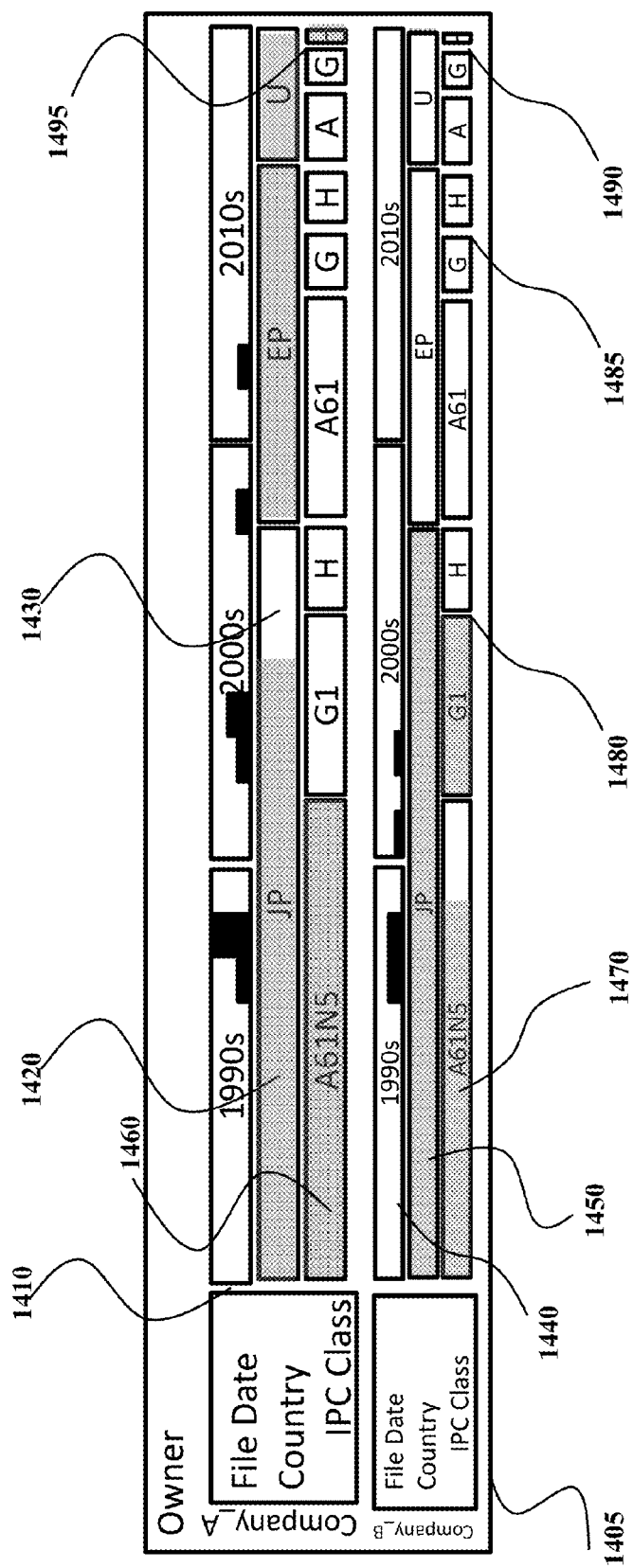
FIG. 14 is an example of both proportional and non-proportional rendering according to one embodiment of the invention.

FIG. 14 shows an example of both proportional and non-proportional rendering according to one embodiment of the invention. The example is based on the graphical areas allocated in 1100 as determined by the data table 400, the hierarchy of attributes 500, and the normalized hierarchy of value partitions 700. The top level attribute Owner 510 is rendered proportionally 1405. The next level of the tree has two siblings, File_Date 520 and Country 530. The values for File_Date 520 are rendered non-proportionally, as histograms in rows 1410 and 1440. The values for Country 530 are rendered proportionally by dividing each partition's graphical areas into two portions representing the percentage of the maximal value of the normalized partition. For example, the graphical areas 1420 and 1430 represent the percentage of the value/Company A/Country/JP against the maximal value of that partition shown in 1450. The percentages of values for attribute IPC_Class 540 are rendered proportionally within the horizontal extent of their parents, in rows 1460 and 1470.

One embodiment is based on another realization that children of normalized and proportionally rendered elements of the hierarchy may not be normalized and proportionally rendered themselves without losing a uniform density property of visual comparison. The uniform density property (UDP) holds that the ratio between values and the dimensions of the graphical areas representing the values needs to remain constant throughout the hierarchy. If this property holds, the elements are comparable throughout the hierarchy through their relative sizes of the graphical areas. However, if elements representing empty value partitions are added through the normalization process, the relative graphical area available for children of such partitions is affected, and the uniform density property can be violated. A strategy to avoid this problem is to use non-proportional representations for children of normalized proportionally rendered elements in the hierarchy.

An example of this issue is to be found in the comparative widths of IPC_Class H in 1480, 1485, and 1490. Note that the actual measure for this H(05H13) value for these comparable structures in Table 400 is zero in each case. However, the fact that the graphical area of this same value zero has unequal widths makes them non-comparable in a graphical sense. The cause of this violation of the UDP is that horizontal space has already been divided proportionally by the higher level attribute Country. If such space is further divided proportionally, and normalized, by a lower level structure, then comparable values can be squeezed and rendered no longer comparable in that dimension. Note that in the vertical dimension, the values for IPC_Class are still comparable, however, as can be seen, for example, by comparing the width of 1495 with 1490.

A strategy to avoid this problem is to determine how to utilize non-proportional representations for children of normalized proportionally rendered nodes in the rendering of multi-attribute comparative structures. For example, in one embodiment, the children value partitions are rendered in the non-proportional layout if the parent value partition is rendered in the proportional layout. For example, the graphical representations for the children value partitions can include histograms conveying comparative value information through heights, wherein a ratio of a height of the histogram for a value of a child value partition with a maximal height of the histogram bounded by the graphical area equals a ratio of the value of the child value partition with the maximal value among the structurally parallel value partitions of the child value partition.

Figure 15:
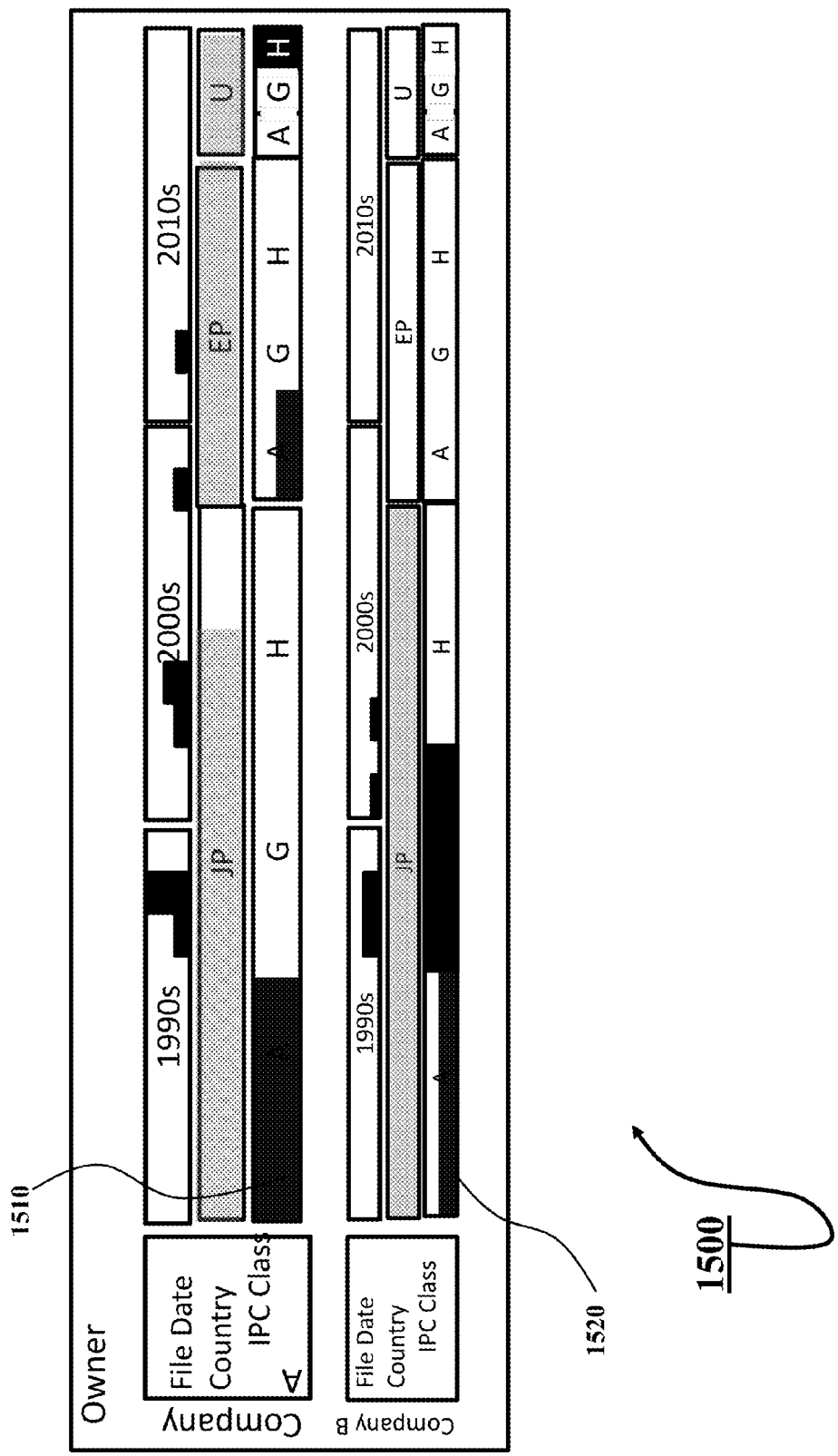
FIG. 15 is an example of both proportional and non-proportional rendering according to another embodiment of the invention.

FIG. 15 shows an alternative rendering that uses a non-proportional representation for values of the IPC_Class node 540 of the attribute tree. The value distributions of /Owner/Country/IPC_Class/ in Table 400 are rendered in the assigned graphical areas within the rows 1510 and 1520 as histograms. Histograms convey comparative value information through height in this case and are independent of the width of the graphical area. All graphics in structurally comparable areas aligned both horizontally and vertically are now comparable. Other non-proportional graphical methods such as scatterplots and line diagrams could also be used in place of histograms.

Figure 16:
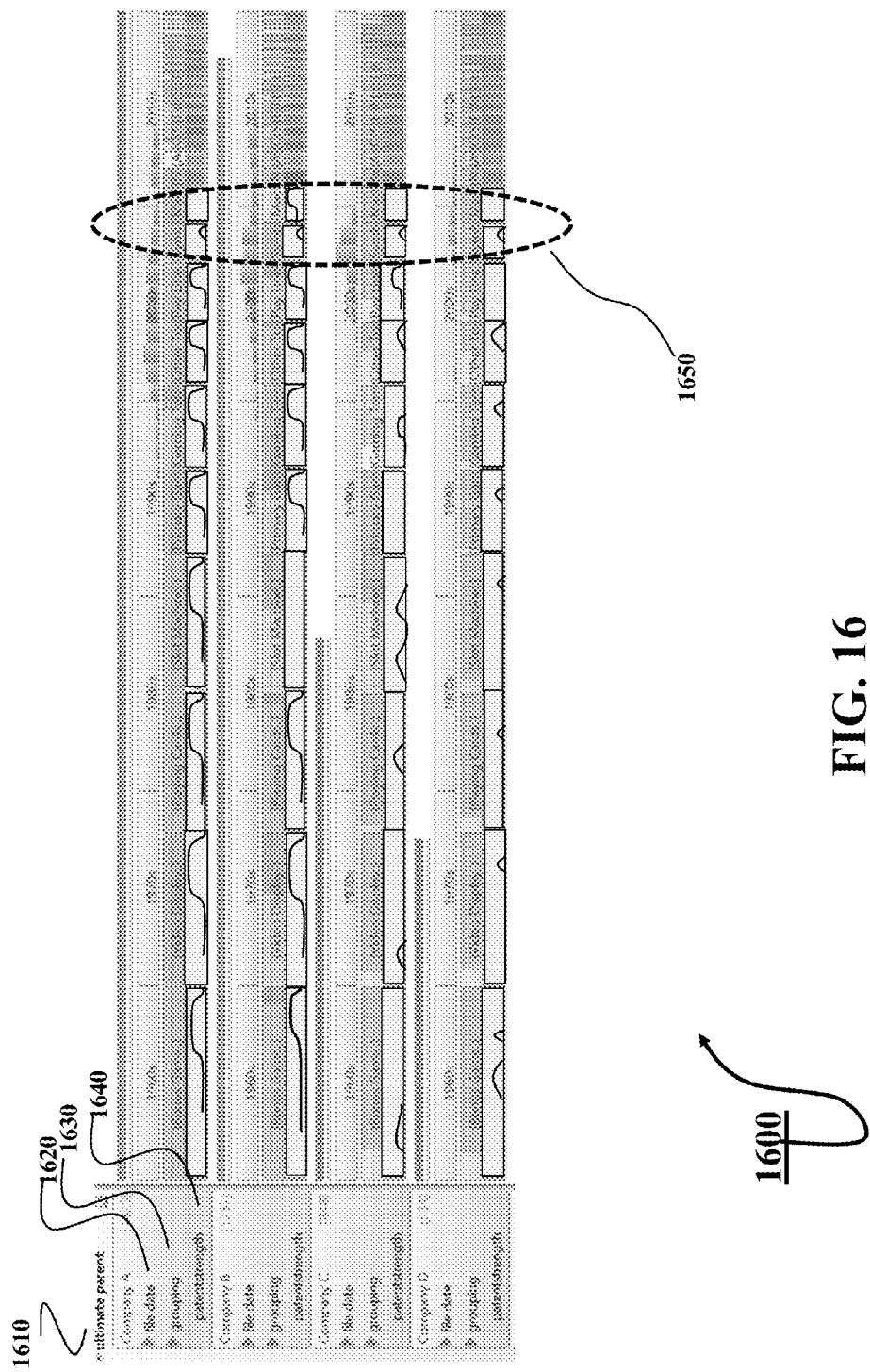
FIG. 16 is an illustration of a comparative layout according to one embodiment of the invention.

FIG. 16 shows another embodiment of our invention and a more informative example of its application in patent landscaping. Four data attributes are shown. Ultimate parent 1610 indicates the corporate parent that owns the patent assets being shown. It forms the top level of the attribute hierarchy, which has two children: file date 1620 indicates filing trends per corporate parent as in our running example; grouping 1630 is an attribute representing domain topics for the patents that has been derived from topic clustering. Groupings are further broken down in the attribute hierarchy tree by patentstrength scores 1640. Scores range from 1 to 100.

The graphical area layout is similar to the example in 1200 in that the top-level of the attribute tree is arranged vertically and the rows are of constant height. Other attribute value partitions within the tree are arranged horizontally. The values for the attribute file date 1630 are rendered non-proportionally as histograms. The values for attribute grouping are rendered proportionally and the partitions are sorted by count. Such a choice allocates more graphical area to the topics of the patents that have a higher count. The graphical areas for patentstrength are determined non-proportionally and rendered as line graphs within the horizontal extent of their parent value renderings for grouping. The line graphs for patentstrength distributions are comparable both horizontally and vertically and comparative structures are easy to locate within the graphical structures. The line graph patterns are comparable independently of the width of the graphical areas.

This example 1600 would be enhanced by the use of color to show the results of comparative functions. For example, a comparative function of the grouping value partitions might determine the number of standard deviations above or below the mean value count for each grouping. Color and saturation could be used to encode these comparative results. For instance, green could be used to indicate a count that is at least one standard deviation above the mean for each comparable grouping value. Orange could indicate at least one standard distribution below the mean. Degree of saturation could indicate how many standard deviations above or below the mean. The use of color could enhance the multi-attribute comparison information present in visualizations such as 1600 and serve the purpose of presenting an overview of information. Both positive and negative comparative information would be emphasized to support the tasks of users.

To explore the information areas circled 1650 can be important for users' tasks that depend on understanding strengths and weaknesses across patent portfolios. In the example, the circled areas 1650 indicate where Company A, which is dominant overall in patent holdings in this data sample, are shown to be relatively weak. It is immediately apparent where competitors have holdings that may present a threat to Company A, and through the patentstrength score distribution, a user could get further information that would lead to more detailed analysis. An analyst or business executive would want to know where relative weaknesses exist in comparable topic areas as well as relative strengths. The use of proportional layouts for some attributes helps to allocate graphical space in such a way that more important blocks of information are given more space in the graphical display. Non-proportional layouts for other attributes preserve comparability of the information and lend themselves to better present some data types such as temporal trends. Insights into the areas of relative strengths and weaknesses helps in R&D planning, business risk mitigation, and merger and acquisition activities.

As can be seen from the examples of this disclosure, the comparative layout of different embodiments can merge the visualization of different types of data, which reduces the need for repeated visualization and saves the computational and memory resources of the digital data visualization system.

Figure 17:
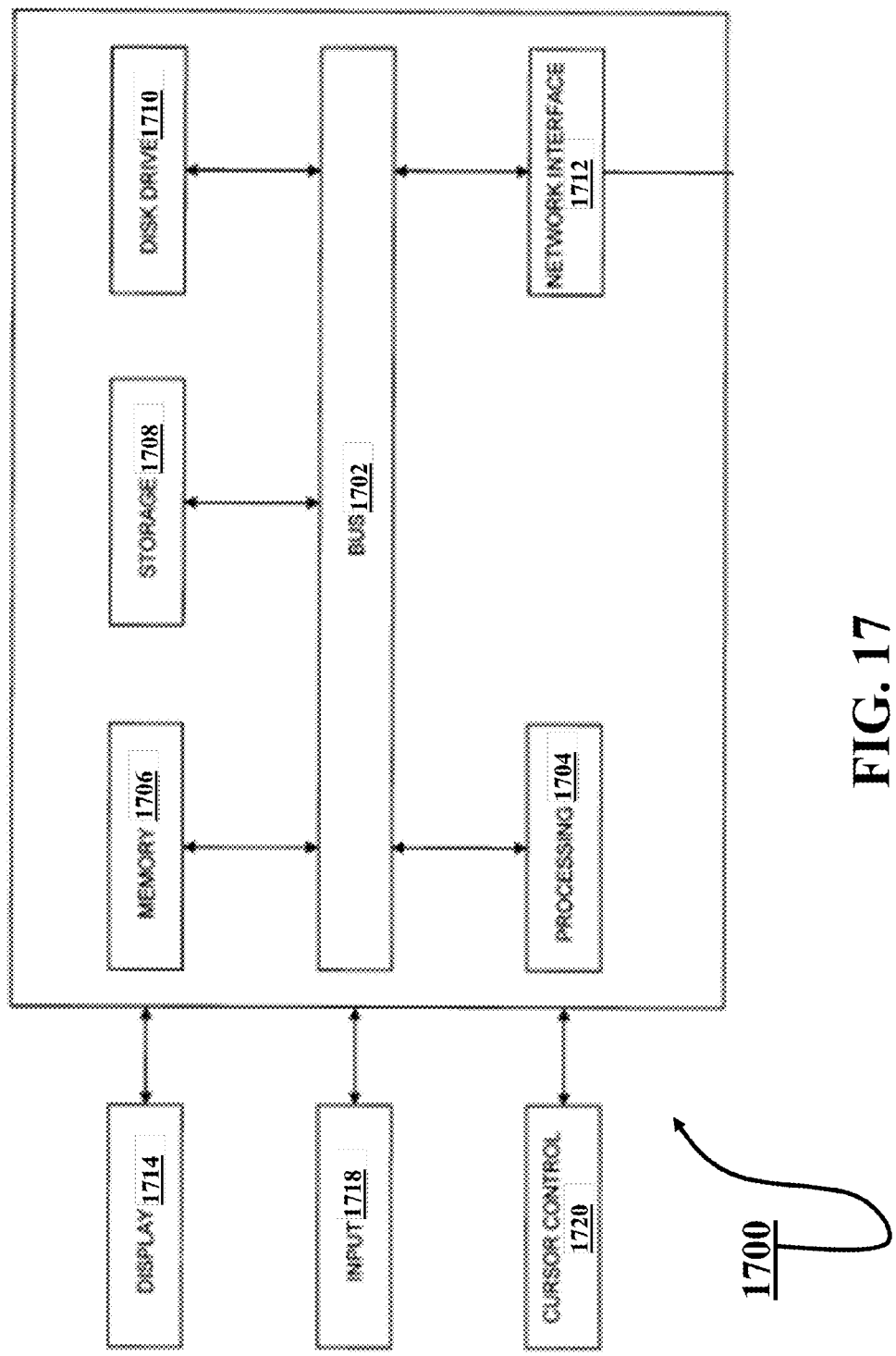
FIG. 17 is a schematic of a system for rendering hierarchical multi-attribute data in a comparative layout according to one embodiment of the invention.

FIG. 17 shows a schematic of a system 1700 for rendering hierarchical multi-attribute data in a comparative layout according to one embodiment of the invention. The system 1700, such as a computer and/or a network server, can include one or combination of a bus 1702 or other communicators for communicating information, which interconnects subsystems and components, such as a processing 1704 (e.g., processor, micro-controller, digital signal processor (DSP), etc.), a system memory 1706 (e.g., RAM), a static storage device 1708 (e.g., ROM), a disk drive 1710 (e.g., magnetic or optical), a network interface component 1712 (e.g., modem or Ethernet card), a display device 1714 (e.g., CRT or LCD), an input interface 1718 (e.g., keyboard, keypad, or virtual keyboard), and/or a cursor controller 1720 (e.g., mouse, pointer, or trackball). In one implementation, the disk drive 1710 includes a database storing the data.

The system 1700 performs specific operations by the processor 1704 executing one or more sequences of instructions contained in the memory 1706. Such instructions can be read into the memory 1706 from another computer readable medium, such as the static storage 1708 or the disk drive 1710. In other embodiments, hard-wired circuitry may be used in place of or in combination with software instructions to implement the present disclosure.

Logic may be encoded in a computer readable medium, which may refer to any medium that participates in providing instructions to the processor 1704 for execution. Such a medium may take many forms, including but not limited to, non-volatile media, volatile media, and transmission media. In many embodiments, the computer readable medium is non-transitory. In various implementations, non-volatile media includes optical or magnetic disks, such as the disk drive component 1710, volatile media includes dynamic memory, such as the system memory 1706, and transmission media includes coaxial cables, copper wire, and fiber optics, including wires that comprise the bus 1702. In one example, transmission media may take the form of acoustic or light waves, such as those generated during radio wave and infrared data communications.

Some common forms of computer readable media includes, for example, floppy disk, flexible disk, hard disk, magnetic tape, any other magnetic medium, CD-ROM, any other optical medium, punch cards, paper tape, any other physical medium with patterns of holes, RAM, PROM, EPROM, FLASH-EPROM, any other memory chip or cartridge, carrier wave, or any other medium from which a computer is adapted to read.

In various embodiments of the present disclosure, execution of instruction sequences to practice the present disclosure may be performed by the computer system 1700. In various other embodiments of the present disclosure, a plurality of the computer systems 1700 coupled through the network interface 1724 (e.g., such as a LAN, WLAN, PTSN, and/or various other wired or wireless networks, including telecommunications, mobile, and cellular phone networks) to perform instruction implementing different embodiments.

Figure 18:
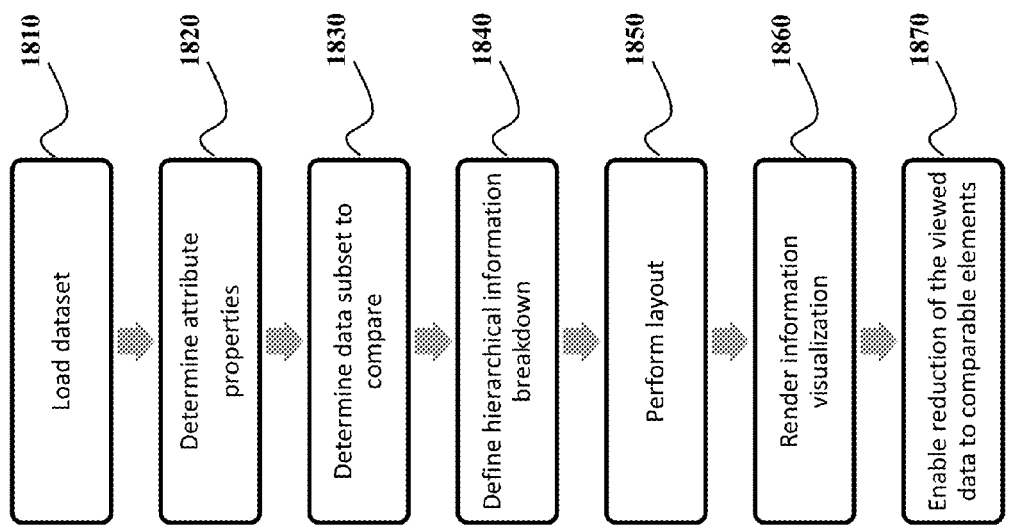
FIG. 18 is a flow chart of a method for selecting and rendering hierarchical multi-attribute data according to one embodiment of the invention.

FIG. 18 shows a flow chart of a method for selecting and rendering hierarchical multi-attribute data according to one embodiment of the invention. The method loads 1810 loads into a memory the multi-attribute data including tabular rows and columns, where the attributes of the data are one of multiple types (numbers, times/dates, categories). The method determines 110 properties of the attributes such as type, aggregation method, sorting properties, measure, and comparison function and determines 120 a subset of the data for the purposes of comparison. Typically, multi-attribute datasets may include many attributes of the data that are not useful for comparison and many rows that may not be relevant to the comparison at hand. To that end, the method determines 130 the subsets of the data to compare determines 140 a hierarchical information breakdown by specifying a hierarchy of attributes for the selected data.

The method further determines 1850 a comparative layout for rendering 1860 the data using various embodiments of the invention. The method also can enable 1870 reduction of the data viewed in the comparative data visualization by selection of comparable elements in the structure and reduction of the view to those elements.

Figure 19:
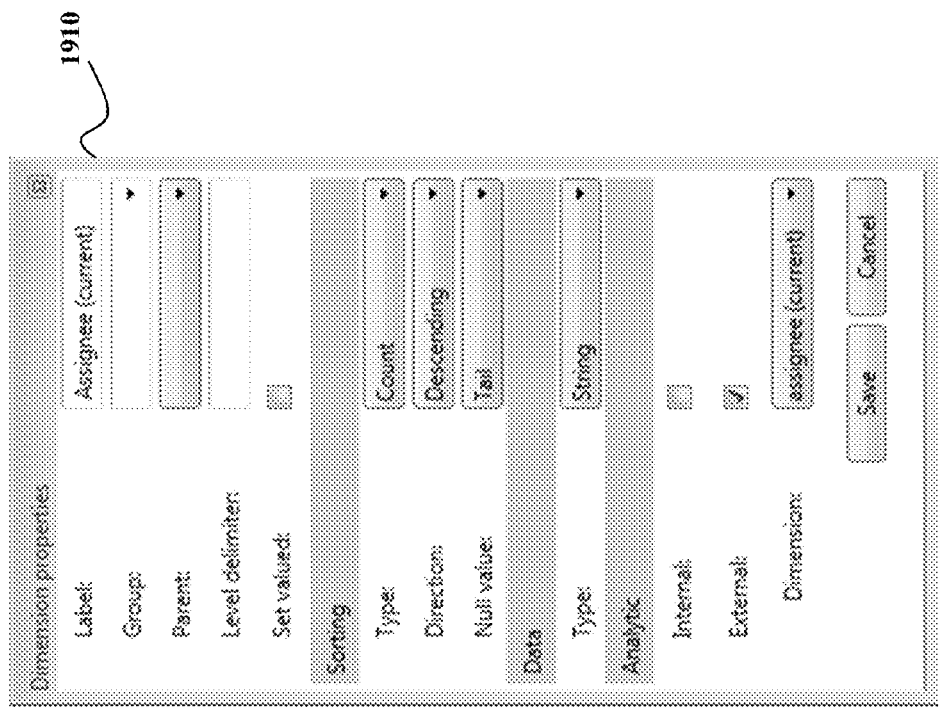
FIG. 19 is an exemplary graphical user interface dialog for setting the properties of the attributes of the data according to one embodiment of the invention.

FIG. 19 shows an exemplary graphical user interface dialog 1910 for setting the properties of the attributes of the data. In some embodiments, the attributes have default properties. Additionally or alternatively, the properties can be selected through the interface 1910.

Figure 20:
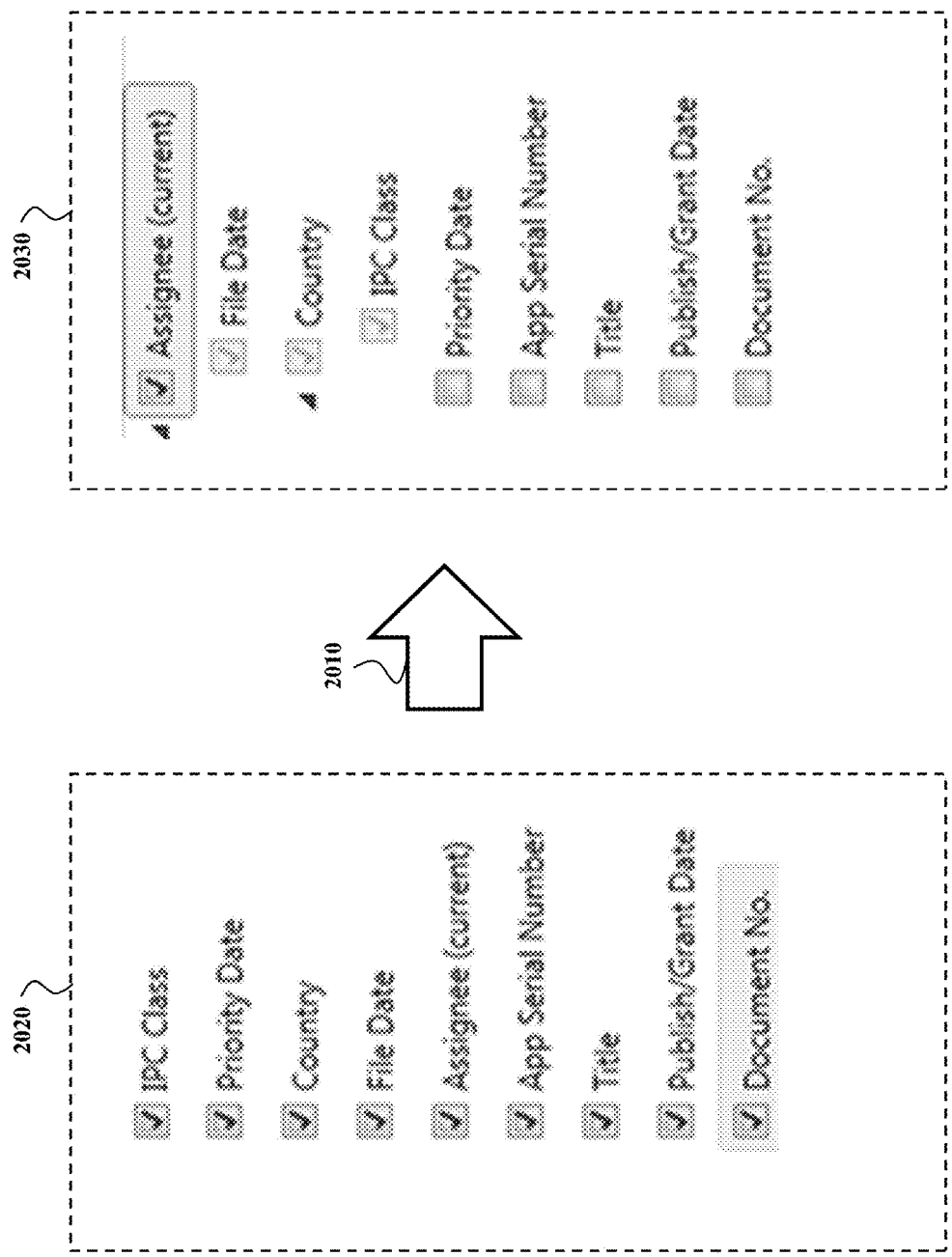
FIG. 20 is a schematic of selection of the hierarchy of attributes from the set of attributes of the data according to one embodiment of the invention.

FIG. 20 is a schematic of selection 2010 of the hierarchy of attributes 2030 from the set of attributes 2020 of the data. The example information structure includes a hierarchy as usually understood. Attributes may be duplicated in order to allow placement of attribute values at multiple levels in the information structure. The rendering of attributes in the comparative layout can be indicated by the presence or absence of a check in the checkboxes.

The above-described embodiments of the present invention can be implemented in any of numerous ways. For example, the embodiments may be implemented using hardware, software or a combination thereof. When implemented in software, the software code can be executed on any suitable processor or collection of processors, whether provided in a single computer or distributed among multiple computers. Such processors may be implemented as integrated circuits, with one or more processors in an integrated circuit component. Though, a processor may be implemented using circuitry in any suitable format.

Also, the embodiments of the invention may be embodied as a method, of which an example has been provided. The acts performed as part of the method may be ordered in any suitable way. Accordingly, embodiments may be constructed in which acts are performed in an order different than illustrated, which may include performing some acts simultaneously, even though shown as sequential acts in illustrative embodiments.

Use of ordinal terms such as "first," "second," in the claims to modify a claim element does not by itself connote any priority, precedence, or order of one claim element over another or the temporal order in which acts of a method are performed, but are used merely as labels to distinguish one claim element having a certain name from another element having a same name (but for use of the ordinal term) to distinguish the claim elements.

Although the invention has been described by way of examples of preferred embodiments, it is to be understood that various other adaptations and modifications can be made within the spirit and scope of the invention. Therefore, it is the object of the appended claims to cover all such variations and modifications as come within the true spirit and scope of the invention.

The invention claimed is:

1. A computer-implemented method for rendering hierarchical multi-attribute data in a comparative layout on a display device, comprising:
   determining a hierarchy of attributes of the data specifying parent-child relationships of the attributes, wherein each attribute has a set of values;
   partitioning iteratively the data according to the hierarchy of attributes to produce a hierarchy of value partitions, wherein the iterative partitioning includes partitioning values of the data according to values of a parent attribute to produce a set of value partitions and further partitioning values of each value partition according to values of children attributes of the parent attribute until the data for all attributes in the hierarchy of attributes are partitioned;
   normalizing the hierarchy of value partitions by adding an empty value partition for each value of the attribute missing from the hierarchy of value partitions and ordering the value partitions;
   allocating graphical areas for value partitions of the normalized hierarchy of value partitions within a graphical user interface on the display device, wherein the allocating follows the structure and the order of the normalized hierarchy of value partitions, such that the graphical area for a parent value partition contains the graphical area for its children value partitions in a first dimension, wherein, for at least some graphical areas representing the value partitions in a proportional layout, lengths of the first dimension of the graphical areas for structurally parallel value partitions are equal, and wherein a ratio of lengths of the first dimension of the graphical areas for comparable value partitions equals a ratio of maximal values among structurally parallel value partitions for each corresponding comparable value partition, wherein the comparable value partitions have the same attribute path and different value paths with different values of the last element of the value paths, and wherein the structurally parallel value partitions have the same attribute path and different value paths with the same value of the last element of the value paths; and
   rendering a graphical representation of a value of a value partition within the graphical area of the value partition, wherein steps of the method are performed by a processor operatively connected to the display device.

2. The method of claim 1, wherein the graphical representation of the value of the value partition divides the graphical area of the value partition into two visually distinguishable spaces, wherein a ratio of areas of the two visually distinguishable spaces equals a ratio of the value of the value partition with the maximal value among the structurally parallel value partitions of the value partition.

3. The method of claim 1, wherein the hierarchy of attributes is determined using a model of the data that organizes values of the data in a table structure having a plurality of columns corresponding to the dimensions of the data and a plurality of rows corresponding to records of the data, wherein each value of the data is identified by an intersection of a column and a row, further comprising:
   selecting a set of attributes from the dimensions of the data;
   organizing the set of attributes into the hierarchy; and
   binning the data according to the set of attributes to determine the set of values for each attribute.

4. The method of claim 1, wherein the graphical representation includes one or combination of a histogram, a scatter plot, and a connected line graph utilizing common y-scale representing the value of the value partition.

5. The method of claim 1, wherein lengths of the graphical areas of the value partitions along a second dimension orthogonal to the first dimension is a function of a value of a value partition determined for a first value on a corresponding value path.

6. The method of claim 1, wherein, for at least some graphical areas representing the value partitions in a non-proportional layout, the method further comprises:
   regularizing x- and y-dimension scales of the graphical representations for the values of the structurally parallel value partitions, wherein the graphical representations for the non-proportional layout include one or combination of a histogram, a scatter plot, and a connected line graph utilizing common y-scale representing the value of the value partition.

7. The method of claim 6, wherein children value partitions are rendered in the non-proportional layout if the parent value partition is rendered in the proportional layout.

8. The method of claim 7, wherein the graphical representations for the children value partitions includes histograms conveying comparative value information through heights, wherein a ratio of a height of the histogram for a value of a child value partition with a maximal height of the histogram bounded by the graphical area equals a ratio of the value of the child value partition with the maximal value among the structurally parallel value partitions of the child value partition.

9. A system for rendering hierarchical multi-attribute data in a comparative layout, comprising:
   a display device;
   a memory to store the data, wherein values of the data are organized in a table structure having a plurality of columns corresponding to the dimensions of the data and a plurality of rows corresponding to records of the data, wherein each value of the data is identified by an intersection of a column and a row; and a processor operatively connected to the display device and to the memory, wherein the processor determines a hierarchy of attributes of the data specifying parent-child relationships of the attributes, wherein each attribute has a set of values;

partitions iteratively the data according to the hierarchy of attributes to produce a hierarchy of value partitions, wherein the iterative partitioning includes partitioning values of the data according to values of a parent attribute to produce a set of value partitions and further partitioning values of each value partition according to values of child attributes of the parent attribute until the data for all attributes in the hierarchy of attributes are partitioned;

normalizes the hierarchy of value partitions by adding an empty value partition for each value of the attribute missing from the hierarchy of value partitions and ordering the value partitions in the normalized hierarchy of value partitions;

allocates graphical areas within a graphical user interface on the display device for value partitions of the normalized hierarchy of value partitions, the allocating following the structure and the order of the normalized hierarchy of value partitions, such that the graphical area for a parent value partition contains the graphical area for its children value partitions in a first dimension, wherein, for at least some graphical areas representing the value partitions in a proportional layout, lengths of the first dimension of the graphical areas for structurally parallel value partitions are equal, and wherein a ratio of lengths of the first dimension of the graphical areas for comparable value partitions equals a ratio of maximal values among structurally parallel value partitions for each corresponding comparable value partition, wherein the comparable value partitions have the same attribute path and different value paths with different values of the last element of the value paths, and wherein the structurally parallel value partitions have the same attribute path and different value paths with the same value of the last element of the value paths; and renders a graphical representation of a value of a value partition within the graphical area of the value partition.

10. The system of claim 9, wherein the graphical representation of the value of the value partition divides the graphical area of the value partition into two visually distinguishable spaces, wherein a ratio of areas of the two visually distinguishable spaces equals a ratio of the value of the value partition with the maximal value among the structurally parallel value partitions of the value partition.

11. The system of claim 9, wherein lengths of the graphical areas of the value partitions along a second dimension orthogonal to the first dimension is a function of a value of a value partition determined for a first value on a corresponding value path.

12. The system of claim 9, wherein, for at least some graphical areas representing the value partitions in a non-proportional layout, the method further comprises:

regularizing the x- and y-dimension scales of the graphical representations for the values of the structurally parallel value partitions, wherein the graphical representations for the non-proportional layout include one or combination of a histogram, a scatter plot, and a connected line graph utilizing common y-scale representing the value of the value partition.

13. The system of claim 12, wherein children value partitions are rendered in the non-proportional layout if the parent value partition is rendered in the proportional layout.

14. The system of claim 13, wherein the graphical representations for the children value partitions includes histograms conveying comparative value information through heights, wherein a ratio of a height of the histogram for a value of a child value partition with a maximal height of the histogram bounded by the graphical area equals a ratio of the value of the child value partition with the maximal value among the structurally parallel value partitions of the child value partition.

15. A non-transitory computer-readable medium with instructions stored thereon, that when executed by a processor, perform steps comprising:

determining a hierarchy of attributes of hierarchical multi-attribute data specifying parent-child relationships of the attributes, wherein each attribute has a set of values;

partitioning iteratively the data according to the hierarchy of attributes to produce a hierarchy of value partitions, wherein the iterative partitioning includes partitioning values of the data according to values of a parent attribute to produce a set of value partitions and further partitioning values of each value partition according to values of child attributes of the parent attribute until the data for all attributes in the hierarchy of attributes are partitioned;

normalizing the hierarchy of value partitions by adding an empty value partition for each value of the attribute missing from the hierarchy of value partitions and ordering the value partitions;

allocating graphical areas within a graphical user interface on a display device for value partitions of the normalized hierarchy of value partitions, the allocating following the structure and the order of the normalized hierarchy of value partitions, such that the graphical area for a parent value partition contains the graphical area for its children value partitions in a first dimension, wherein, for at least some graphical areas representing the value partitions in a proportional layout, lengths of the first dimension of the graphical areas for structurally parallel value partitions are equal, and wherein a ratio of lengths of the first dimension of the graphical areas for comparable value partitions equals a ratio of maximal values among structurally parallel value partitions for each corresponding comparable value partition, wherein the comparable value partitions have the same attribute path and different value paths with different values of the last element of the value paths, and wherein the structurally parallel value partitions have the same attribute path and different value paths with the same value of the last element of the value paths; and rendering a graphical representation of a value of a value partition within the graphical area of the value partition.

* * * * *